US012586319B2

(12) United States Patent
    Izumihara

(10) Patent No.:    US 12,586,319 B2
(45) Date of Patent:    Mar. 24, 2026

(54) INFORMATION PROCESSING METHOD, PROGRAM, AND SYSTEM FOR CONTROLLING A MOBILE OBJECT BY SETTING A VIRTUAL VIEWPOINT AND OPERABLE RANGE

(71) Applicant: Sony Group Corporation, Tokyo (JP)

(72) Inventor: Atsushi Izumihara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 289 days.

(21) Appl. No.: 18/002,663

(22) PCT Filed: Jul. 7, 2021

(86) PCT No.: PCT/JP2021/025582
    § 371 (c)(1),
    (2) Date: Dec. 21, 2022

(87) PCT Pub. No.: WO2022/014429
    PCT Pub. Date: Jan. 20, 2022

(65) Prior Publication Data
    US 2023/0245397 A1      Aug. 3, 2023

(30) Foreign Application Priority Data
    Jul. 16, 2020    (JP) ................................. 2020-122143

(51) Int. Cl.
    *G06T 15/20*          (2011.01)
    *G06T 19/00*          (2011.01)
    *G06T 19/20*          (2011.01)
(52) U.S. Cl.
    CPC ........... *G06T 19/006* (2013.01); *G06T 15/20* (2013.01); *G06T 19/003* (2013.01); *G06T 19/20* (2013.01);
    (Continued)

(58) Field of Classification Search
    CPC ..... G06T 15/20; G06T 19/003; G06T 19/006; G06T 19/20; G06T 2200/24; G06T 2219/2016
    (Continued)

(56) References Cited

U.S. PATENT DOCUMENTS 10,139,631 B1 *  11/2018  Da Veiga ............. G05D 1/0094
2016/0349849 A1 *  12/2016  Kwon ..................... G06F 3/017
                        (Continued)

FOREIGN PATENT DOCUMENTS

JP        2003-532218 A      10/2003
JP        2008-52641 A      3/2008
                        (Continued)

OTHER PUBLICATIONS

International Search Report and Written Opinion mailed on Sep. 14, 2021, received for PCT Application PCT/JP2021/025582, filed on Jul. 7, 2021, 11 pages including English Translation.

*Primary Examiner* — Jacinta M Crawford
(74) *Attorney, Agent, or Firm* — XSENSUS LLP

(57)          ABSTRACT

[Object] To provide an information processing method, a program, and a system that are capable of exhibiting high intuitiveness in operation.
[Solving Means] In order to achieve the above object, an information processing method according to an embodiment of the present technology is an information processing method executed by a computer system, the method including controlling setting of a virtual viewpoint of a user with respect to a real space and setting of an operable range in which an operation relating to the real space can be executed by the user with respect to the real space. This makes it possible to exhibit high intuitiveness in operation. Further, the operable range is set to the range within the reach of a (Continued)

controller held by the user, that is, the range within the reach of the user, and thus the physical spatial perception ability of a human can be used.

16 Claims, 18 Drawing Sheets

(52) U.S. Cl.
CPC .. *G06T 2200/24* (2013.01); *G06T 2219/2016* (2013.01)

(58) Field of Classification Search
USPC .......................................................... 345/633
See application file for complete search history.

(56) References Cited

U.S. PATENT DOCUMENTS

| | | | | |
|---|---|---|---|---|
| 2017/0251180 | A1* | 8/2017 | Smolyanskiy | ......... H04N 7/185 |
| 2018/0094931 | A1* | 4/2018 | Taylor | ................ G01C 21/3867 |
| 2019/0077504 | A1* | 3/2019 | Chapman | ........... G01C 21/3647 |
| 2019/0088025 | A1* | 3/2019 | Tamanaha | ............. G06F 3/0484 |
| 2019/0318634 | A1 | 10/2019 | Ma et al. | |

FOREIGN PATENT DOCUMENTS

| | | | |
|---|---|---|---|
| JP | 2014-92987 | A | 5/2014 |
| JP | 2016-57947 | A | 4/2016 |
| JP | 2016-82441 | A | 5/2016 |
| JP | 2018-535487 | A | 11/2018 |

* cited by examiner

A

B

C

A

B

A

B

C

START

Three-dimensionally measure space/read known map ⟋ ST401

Select predetermined direction ⟋ ST402

Set two-dimensional position of reference point on candidate plane ⟋ ST403

Move selected point in perpendicular direction ⟋ ST404

Change scale of operable range ⟋ ST405

Set virtual viewpoint ⟋ ST406

END

A

B

C

D

INFORMATION PROCESSING METHOD, PROGRAM, AND SYSTEM FOR CONTROLLING A MOBILE OBJECT BY SETTING A VIRTUAL VIEWPOINT AND OPERABLE RANGE

CROSS-REFERENCE TO RELATED APPLICATIONS

The present application is based on PCT filing PCT/JP2021/025582, filed Jul. 7, 2021, which claims priority to JP 2020-122143, filed Jul. 16, 2020, the entire contents of each are incorporated herein by reference.

TECHNICAL FIELD

The present technology relates to an information processing method, a program, and a system that are applicable to virtual representation or the like.

BACKGROUND ART

The video display system described in Patent Literature 1 displays a virtual reality video having the same positional relationship as a real positional relationship between a set measurement target and an observation viewpoint. A difference between the length of the measurement target observed in a real space and the length of the measurement target observed in a virtual reality is input. A ratio for enlarging or reducing the virtual reality video is calculated on the basis of the input value, and the virtual reality video is enlarged or reduced. Thus, Patent Literature 1 discloses displaying a virtual reality video in which a deviation between an impression of an observer and an impression of an object in the video is eliminated (paragraphs [0032] to [0035], FIG. 7, and the like of Patent Literature 1).

CITATION LIST

Patent Literature

Patent Literature 1: Japanese Patent Application Laid-open No. 2008-52641

DISCLOSURE OF INVENTION

Technical Problem

With regard to such virtual representation, there is a demand for a technique capable of exhibiting high intuitiveness in operation.

In view of the circumstances as described above, it is an object of the present technology to provide an information processing method, a program, and a system that are capable of exhibiting high intuitiveness in operation.

Solution to Problem

In order to achieve the above object, an information processing method according to an embodiment of the present technology is an information processing method executed by a computer system, and includes controlling setting of a virtual viewpoint of a user with respect to a real space and setting of an operable range in which an operation relating to the real space can be executed by the user with respect to the real space.

In such an information processing method, the setting of a virtual viewpoint of a user with respect to a real space and the setting of an operable range in which an operation relating to the real space can be executed by the user with respect to the real space are controlled. This makes it possible to exhibit high intuitiveness in operation.

The control step may set a first virtual viewpoint within the real space and sets a second virtual viewpoint different from the first virtual viewpoint within the operable range.

The control step may change a scale of the operable range.

The information processing method may further include a detection step of detecting a candidate plane for setting the virtual viewpoint or the operable range from the real space.

The control step may set a position separated from the detected candidate plane by a predetermined distance as the virtual viewpoint.

The control step may set a position separated from the detected candidate plane by a predetermined distance as a reference point that is a reference of the operable range.

The control step may control the virtual viewpoint or the operable range on the basis of the set reference point.

The information processing method may further include a setting step of setting a position of the virtual viewpoint and a scale of the operable range on the basis of a size of the real space. In this case, the control step may make changes to the set position of the virtual viewpoint and the set scale of the operable range with the reference point as a reference.

The detection step may detect the candidate plane on the basis of a predetermined axis of the real space.

The control step may change a scale of the operable range on the basis of a position of the virtual viewpoint.

The control step may set a position of the virtual viewpoint on the basis of a scale of the operable range.

The information processing method may further include a presentation step of presenting a graphical user interface (GUI) capable of controlling the virtual viewpoint and the operable range to the user.

The presentation step may present a virtual viewpoint image obtained when the user views the real space from the virtual viewpoint. In this case, the GUI may be capable of setting a first virtual viewpoint within the real space and setting a second virtual viewpoint different from the first virtual viewpoint within the operable range.

The GUI may be capable of setting the candidate plane within the operable range.

The real space may be a three-dimensional map created by a sensor.

The control step may change a scale of the operable range on the basis of the three-dimensional map created by the sensor.

The sensor may be mounted on a mobile object.

The GUI may be capable of generating a path, along which the mobile object moves, by an operation of the user.

A program according to an embodiment of the present technology causes a computer system to execute the following step: a control step of controlling setting of a virtual viewpoint of a user with respect to a real space and setting of an operable range in which an operation relating to the real space can be executed by the user with respect to the real space.

An information processing system according to an embodiment of the present technology includes a mobile object and an information processing apparatus.

The mobile object moves in a real space.

The information processing apparatus includes a control unit that controls setting of a virtual viewpoint of a user with respect to the real space and setting of an operable range in which an operation relating to the real space can be executed by the user with respect to the real space.

MODE(S) FOR CARRYING OUT THE INVENTION

Embodiments according to the present technology will now be described below with reference to the drawings.

First Embodiment

Figure 1:
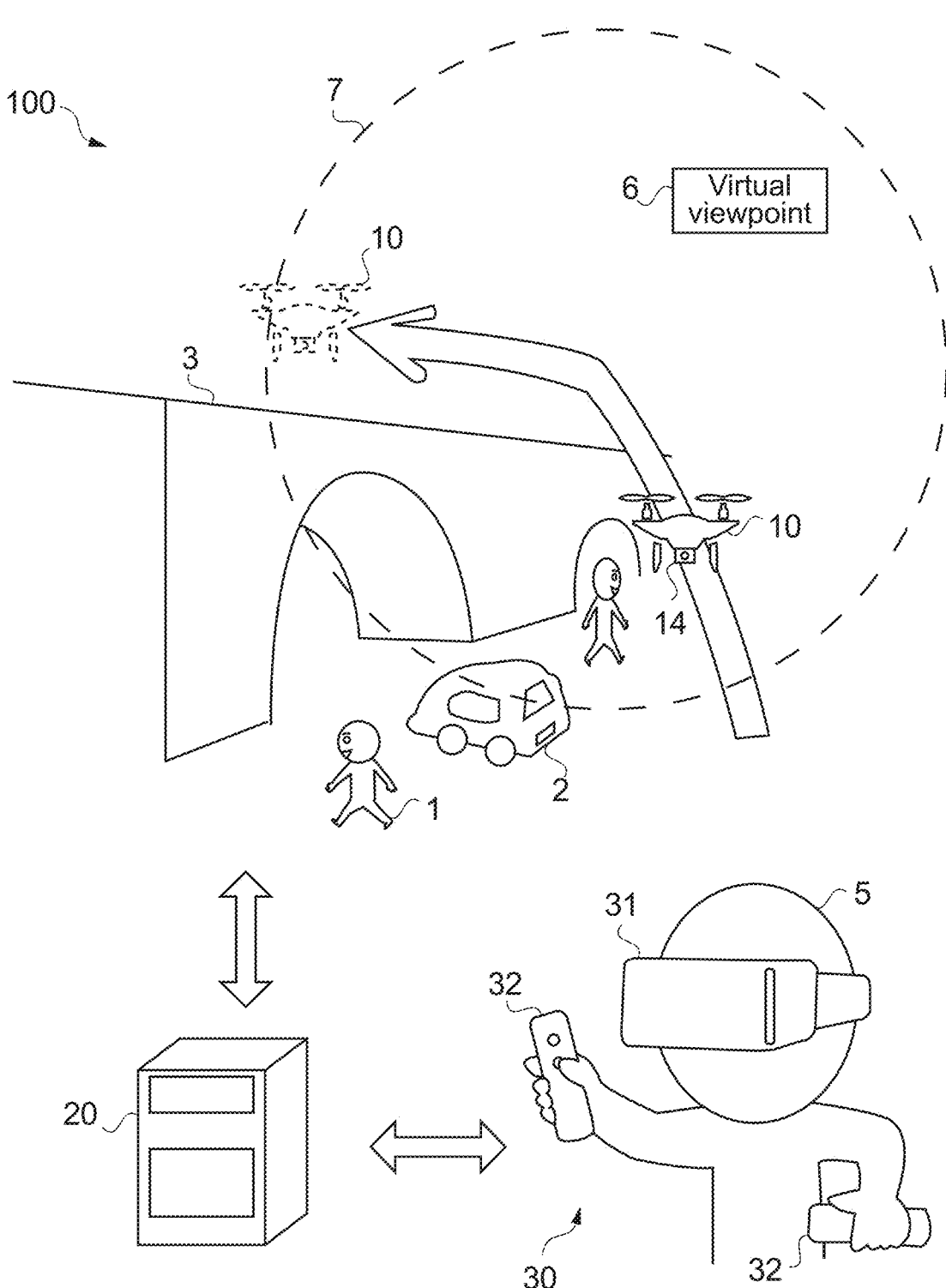
FIG. 1 is a diagram schematically showing an appearance of a virtual representation system.

FIG. 1 is a diagram schematically showing an appearance of a virtual representation system according to a first embodiment of the present technology.

As shown in FIG. 1, a virtual representation system 100 includes a mobile object 10, an information processing apparatus 20, and a user device 30. The mobile object 10, the information processing apparatus 20, and the user device 30 are communicably connected to each other through wire or radio. The connection forms between the respective devices are not limited, and for example, wireless LAN communication such as WiFi or short-range wireless communication such as Bluetooth (registered trademark) can be used.

The mobile object 10 is, for example, a drone capable of automated flight.

In this embodiment, the mobile object 10 includes a sensor unit 14 capable of observing the periphery. For example, the sensor unit 14 includes an imaging device such as a stereo camera, a digital camera, or a monocular camera. Further, for example, in the sensor unit 14, 360-degree cameras capable of capturing images at 360 degrees around the mobile object 10 or stereo cameras may be disposed in front and rear, right and left, and up and down directions (different directions). In addition to this, sensor devices such as a time-of-flight (ToF) sensor, a laser ranging sensor, a contact sensor, an ultrasonic sensor, LiDAR (Light Detection and Ranging, Laser Imaging Detection and Ranging), and a sonar may be used.

Note that the mobile object 10 is not limited to a drone and may be, for example, a wheel type robot, a multilegged walking robot, or a robot including a leg portion having a multi-joint structure.

Further, in this embodiment, the sensing result of the sensor unit 14 mounted on the mobile object 10 is supplied to the information processing apparatus 20.

The information processing apparatus 20 generates a three-dimensional map of the periphery of the mobile object 10 on the basis of the sensing result supplied from the mobile object 10.

The three-dimensional map is a stereoscopic map that displays an environment around the mobile object 10. For example, in FIG. 1, a three-dimensional map including a person 1, a vehicle 2, and a pedestrian bridge 3 is generated by the information processing apparatus 20.

Note that the method of generating the three-dimensional map is not limited. For example, computer aided design (CAD) and the like may be used.

Further, the information processing apparatus 20 controls the setting of a virtual viewpoint 6 of a user 5 with respect to the three-dimensional map and the setting of an operable range 7 with respect to the three-dimensional map. In this embodiment, the information processing apparatus 20 changes the setting of the position of the virtual viewpoint 6 and the scale of the operable range 7 in accordance with an operation of the user 5.

The virtual viewpoint is a virtual viewpoint of the user 5, which is set at any location (coordinates) in the three-dimensional map. For example, the user 5 can view the mobile object 10 and the pedestrian bridge 3 in a bird's-eye view from the set virtual viewpoint 6.

The operable range is a range, over which an operation relating to the three-dimensional map by the user 5 is performed, in the three-dimensional map. Further, the scale of the operable range includes a size such as a volume or an area of the operable range, and a shape such as a circle, a circular cylinder, or a rectangular parallelepiped.

The operation of the user includes setting of the virtual viewpoint 6, change of the scale of the operable range 7, and generation of a path through which the mobile object 10 moves.

Note that the scale of the operable range 7 is not limited and may be set to any size and shape.

The user device 30 is a terminal operated by the user 5. In this embodiment, a head-mounted display 31 (HMD) such as a VR headset and a controller 32 are used in the user device 30.

The HMD 31 includes, for example, various sensors capable of detecting a posture of the user 5, a position of the eye, a line of sight, and the like.

The controller 32 includes, for example, an inertial measuring unit (IMU) that detects accelerations, angular velocities, and the like by buttons or the operations of the user 5.

The user 5 can visually recognize the three-dimensional map from the virtual viewpoint 6 via the HMD 31. Further, the user 5 can set the virtual viewpoint 6, change the scale of the operable range 7, and generate a path of the mobile object 10 within the operable range 7 via the controller 32.

For example, the user 5 can generate a trajectory obtained when the right hand holding the controller 32 is moved, as a path of the mobile object 10. Further, for example, the position of the hand of the user 5 can be set as a new virtual viewpoint. In other words, the operable range 7 can also be a distance within the reach of the user 5 holding the controller 32.

Figure 2:
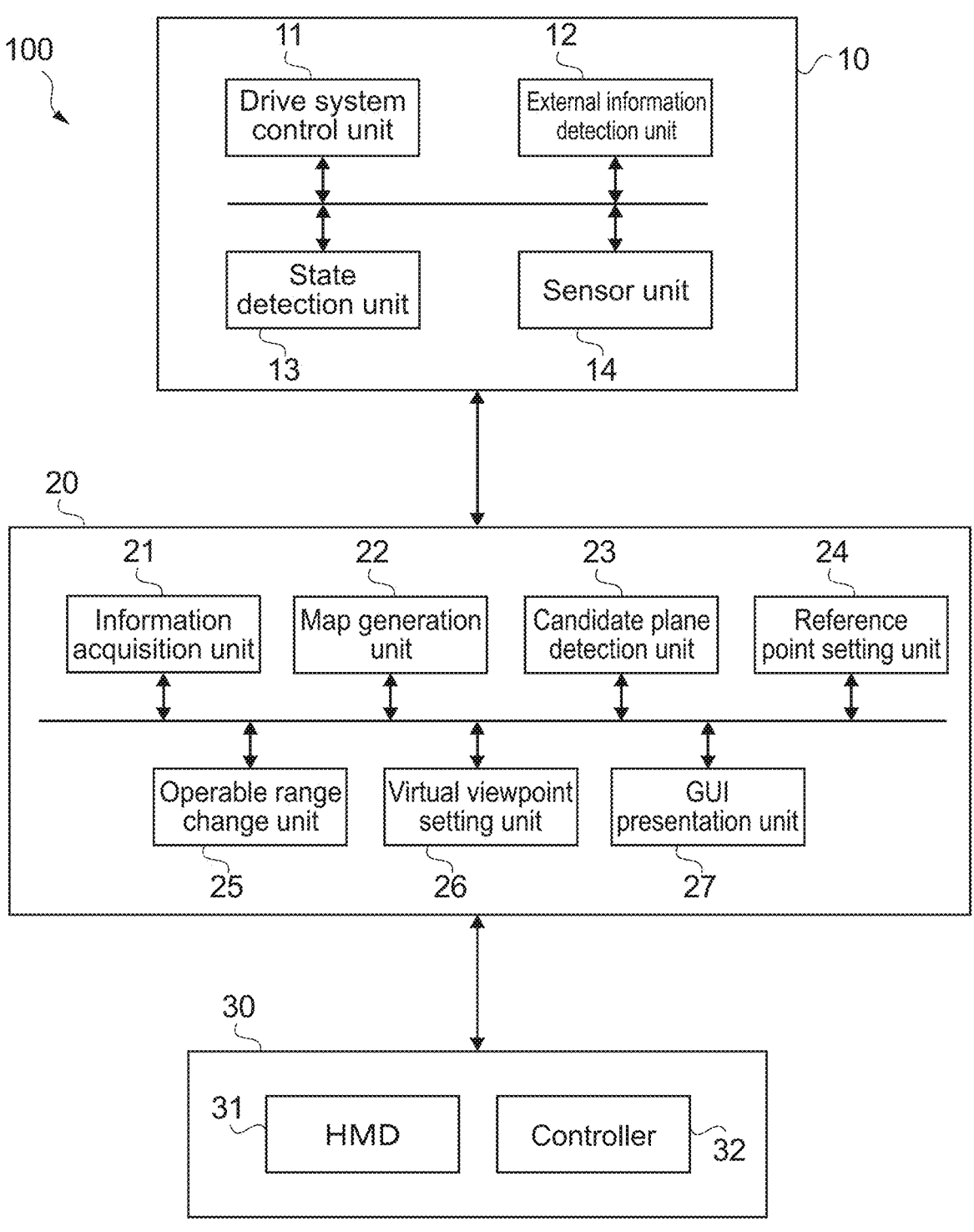
FIG. 2 is a block diagram showing a functional configuration example of the virtual representation system.

FIG. 2 is a block diagram showing a functional configuration example of the virtual representation system 100.

As shown in FIG. 2, the virtual representation system 100 includes the mobile object 10, the information processing apparatus 20, and the user device 30.

The mobile object 10 includes a drive system control unit 11, an external information detection unit 12, a state detection unit 13, and the sensor unit 14.

The drive system control unit 11 generates various control signals of the mobile object 10 and controls various devices relating to the drive system of the mobile object 10.

For example, the mobile object 10 includes a servo motor capable of specifying an angle or a torque, which is provided in each joint of four feet, a motion controller for decomposing and replacing a movement of the robot itself into and with the movement of four feet, and a feedback control device by a sensor in each motor and a sensor on a sole surface of the foot.

Further, for example, the mobile object 10 may include a drive force generation device for generating a drive force for an internal combustion engine, a drive motor, or the like, a drive force transmitting mechanism for transmitting a drive force to wheels, a steering mechanism for adjusting a steering angle, a braking device for generating a braking force, an antilock brake system (ABS), an electronic stability control (ESC), an electric power steering device, and the like.

The external information detection unit 12 performs detection processing of information outside the mobile object 10 on the basis of the sensing result of the sensor unit 14. For example, the external information detection unit 12 performs detection processing, recognition processing, and tracking processing of an object around the mobile object 10, and detection processing of a distance to the object.

Further, for example, the external information detection unit 12 performs detection processing of a surrounding environment of the mobile object 10. Examples of the surrounding environment to be detected include weather, temperature, humidity, brightness, and a road surface condition.

In this embodiment, the external information detection unit 12 supplies data indicating the result of the detection processing to an information acquisition unit 21.

The state detection unit 13 detects the state of the mobile object 10 on the basis of data or signals from the drive system control unit 11. For example, the state detection unit 13 detects the speed, the acceleration, the steering angle, the presence or absence and contents of an abnormality of the mobile object 10, the state of another mobile object-mounted device, and the like.

In this embodiment, the state detection unit 13 supplies data indicating the result of the detection processing to the information acquisition unit 21.

The sensor unit 14 observes the periphery of the mobile object 10. In this embodiment, the sensing result acquired by the sensor unit 14 is output to the external information detection unit 12 and the information acquisition unit 21.

Figure 18:
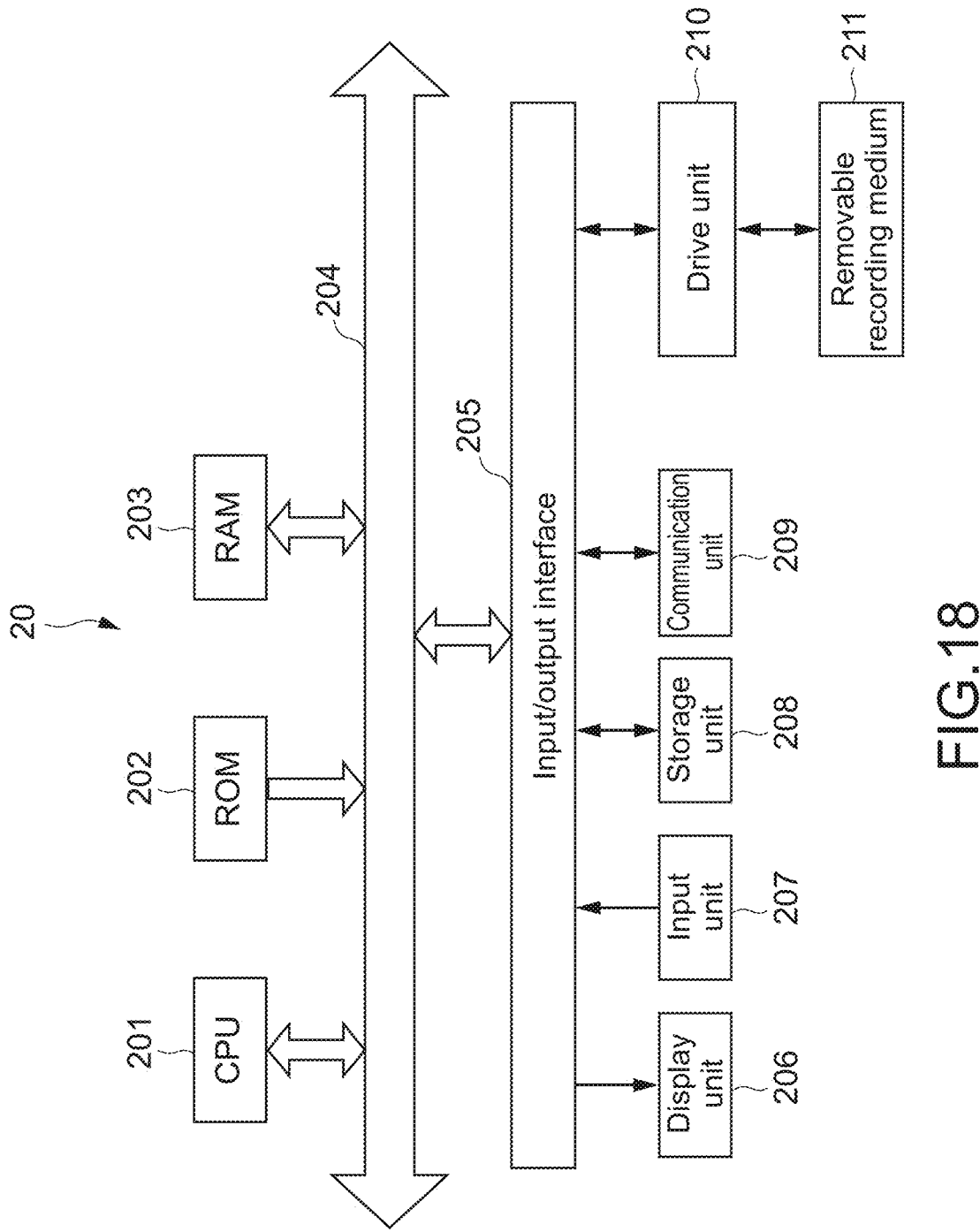
FIG. 18 is a block diagram showing a hardware configuration example of an information processing apparatus.

The information processing apparatus 20 includes hardware necessary for the configuration of the computer, e.g., a processor such as a CPU, a GPU, or a DSP, a memory such as a ROM or a RAM, a storage device such as an HDD, and the like (see FIG. 18). For example, when the CPU loads a program according to the present technology, which is recorded in advance in the ROM or the like, into the RAM and executes the program, the information processing method according to the present technology is executed.

For example, the information processing apparatus 20 can be implemented by any computer such as a personal computer (PC). Of course, hardware such as a FPGA or ASIC may be used.

In this embodiment, the CPU executes a predetermined program to constitute an operable range change unit and a virtual viewpoint setting unit as functional blocks. Of course, dedicated hardware such as an integrated circuit (IC) may be used to implement the functional blocks.

The program is installed in, for example, the information processing apparatus 20 via various recording media. Alternatively, the program may be installed via the Internet or the like.

The type or the like of the recording medium on which the program is recorded is not limited, and any computer-readable recording medium may be used. For example, any non-transitory computer-readable storage medium may be used.

As shown in FIG. 2, the information processing apparatus 20 includes the information acquisition unit 21, a map generation unit 22, a candidate plane detection unit 23, a reference point setting unit 24, an operable range change unit 25, a virtual viewpoint setting unit 26, and a graphical user interface (GUI) presentation unit 27.

The information acquisition unit 21 acquires various types of information. In this embodiment, the information acquisition unit 21 acquires various types of information from the mobile object 10 and the user device 30. For example, a sensing result regarding an obstacle such as an object or a wall around the mobile object 10 is acquired. Further, for example, the operation information of the user 5 input by the user device 30 is acquired.

Further, in this embodiment, the information acquisition unit 21 supplies the acquired various types of information to the map generation unit 22. The information acquisition unit 21 also supplies the operation information input to the user device 30 to the drive system control unit 11.

The map generation unit 22 acquires a three-dimensional map of the periphery of the mobile object 10. In this embodiment, the map generation unit 22 generates a three-dimensional map on the basis of the sensing result acquired by the information acquisition unit 21. For example, the map generation unit 22 may generate a self-location and a three-dimensional map of the mobile object 10 by simultaneous localization and mapping (SLAM).

Specifically, the map generation unit 22 accumulates the time-series information supplied in time series in a database on the basis of the detection result supplied from the sensor unit 14, estimates a self-location on the basis of the accumulated time-series information, and outputs the estimated self-location as time-series information self-location.

Further, the map generation unit 22 estimates a self-location on the basis of the current detection result supplied from the sensor unit 14, and outputs the estimated self-location as current information self-location. The map generation unit 22 then outputs a self-location estimation result by integrating or switching the time-series information self-location and the current information self-location. Moreover, when the posture of the mobile object 10 is detected on the basis of the detection result supplied from the state detection unit 13, the change in the posture is detected, the self-position greatly changes, and the estimation accuracy of the time-series information self-location is considered to be lowered, the map generation unit 22 may estimate a self-position from only the current information self-location.

Further, the map generation unit 22 may acquire a three-dimensional map prepared in advance. For example, if the mobile object 10 is moved on the first floor of a building, a map of the first floor of the building may be acquired.

The candidate plane detection unit 23 detects a candidate plane from the three-dimensional map.

The candidate plane is a plane for setting a virtual viewpoint or an operable range. In this embodiment, a predetermined plane in the three-dimensional map generated by the map generation unit 22 is detected as a candidate plane. For example, an X-plane, a Y-plane, and a Z-plane in the three-dimensional map are detected as candidate planes. Further, for example, a predetermined direction in the three-dimensional map is set as a direction of gravity, and a plane perpendicular to the direction of gravity is detected as a candidate plane.

Further, in this embodiment, the candidate plane detection unit 23 supplies the detected candidate plane to the reference point setting unit 24 and the virtual viewpoint setting unit 26.

The reference point setting unit 24 sets a reference point serving as a reference of the operable range. In this embodiment, the reference point setting unit 24 sets a reference point on the basis of the candidate plane detected by the candidate plane detection unit 23. For example, a position separated by a predetermined distance in the perpendicular direction of the candidate plane is set as a reference point. In this case, a reference point may be set in the perpendicular direction from the center of gravity of the candidate plane, or a distance or a position between the candidate plane and the reference point may be set by the user.

In this embodiment, the position information of the reference point set by the reference point setting unit 24 is supplied to the operable range change unit 25 and the virtual viewpoint setting unit 26.

The operable range change unit 25 changes the scale of the operable range on the basis of the set reference point. In this embodiment, the operable range change unit 25 changes the scale of a spherical operable range around the reference point. In other words, the operable range change unit 25 changes the size of the radius of the sphere.

In addition, the operable range change unit 25 associates the scale of the operable range with the position information of the reference point. For example, control may be performed such that the scale of the operable range increases as the reference point moves away from the candidate plane.

The virtual viewpoint setting unit 26 sets the position of the virtual viewpoint on the basis of the detected candidate plane. For example, a position separated by a predetermined distance in the perpendicular direction of the candidate plane is set as a virtual viewpoint. In this case, the virtual viewpoint may be set in the perpendicular direction from the center of gravity of the candidate plane, or the distance and the position between the candidate plane and the virtual viewpoint may be set by the user.

Further, the virtual viewpoint setting unit 26 sets the position of the virtual viewpoint corresponding to the scale of the operable range. For example, the position of the virtual viewpoint may be set so as to move away from the candidate plane as the scale of the operable range increases.

Similarly, the position of the virtual viewpoint corresponding to the position information of the reference point may be set. For example, a position separated from the set reference point by a predetermined distance in the perpendicular direction of the candidate plane may be set as the virtual viewpoint.

In other words, a table in which the scale of the operable range and the position of the virtual viewpoint are associated with the position information of the reference point may be prepared in advance. In this case, by setting of the reference point, the scale of the operable range and the position of the virtual viewpoint are uniquely determined.

Note that the setting of the virtual viewpoint also includes adjustment of a virtual interpupillary distance (IPD) in virtual reality (VR). For example, the interpupillary distance is appropriately set in accordance with the magnitude of the scale of the operable region.

The GUI presentation unit 27 presents a GUI to the user 5. In this embodiment, the GUI presentation unit 27 presents a GUI in which the three-dimensional map can be visually recognized from the virtual viewpoint and the virtual viewpoint and the operable range can be controlled. For example, the user 5 can select the detected candidate plane and set the position of the reference point via the GUI.

Further, the GUI presentation unit 27 presents a GUI capable of generating a path of the mobile object 10. For example, the user 5 can observe the three-dimensional map and the mobile object 10 from the virtual viewpoint via the GUI, and generate a path from the current position of the mobile object 10 to a destination point.

Note that, in this embodiment, the operable range change unit 25 and the virtual viewpoint setting unit 26 execute the step corresponding to a control step of controlling the setting of the virtual viewpoint of the user with respect to the real space and the setting of the operable range in which an operation relating to the real space can be executed by the user with respect to the real space.

Note that, in this embodiment, the candidate plane detection unit 23 executes the step corresponding to a detection step of detecting a candidate plane for setting the virtual viewpoint or the operable range from the real space.

Note that, in this embodiment, the reference point setting unit 24, the operable range change unit 25, and the virtual viewpoint setting unit 26 execute the step corresponding to a setting step of setting the position of the virtual viewpoint and the scale of the operable range on the basis of the size of the real space.

Note that, in this embodiment, the GUI presentation unit 27 executes the step corresponding to a presentation step of presenting a GUI capable of controlling the virtual viewpoint and the operable range.

Note that, in this embodiment, the three-dimensional map corresponds to a real space.

Figure 3:
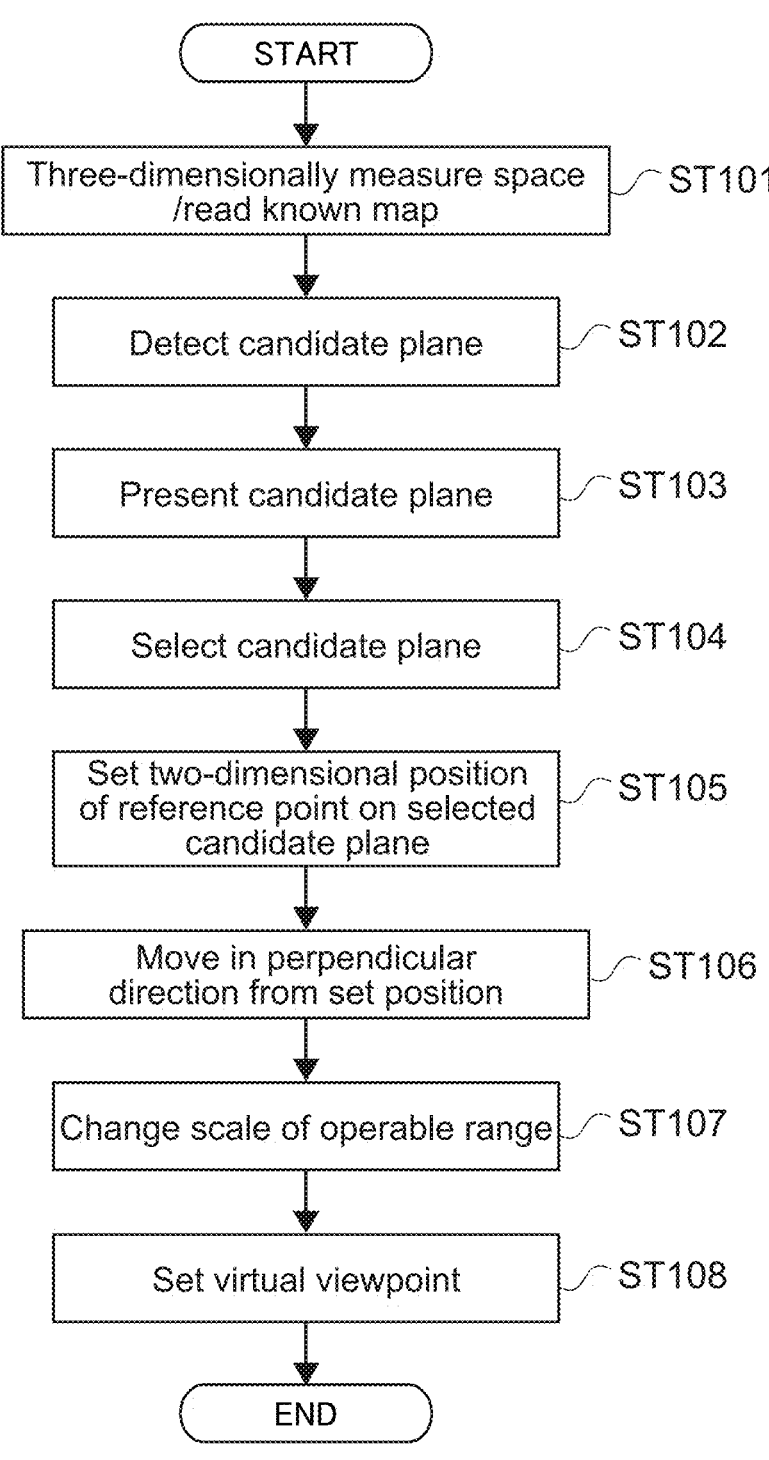
FIG. 3 is a flowchart showing the control of a virtual viewpoint and an operable range.

FIG. 3 is a flowchart showing control of the virtual viewpoint and the operable range.

The sensor unit 14 of the mobile object 10 performs three-dimensional measurement of the real space (Step 101). Alternatively, the information acquisition unit 21 reads a known map prepared in advance. The map generation unit 22 generates a three-dimensional map on the basis of the sensing result of the sensor unit 14.

The candidate plane detection unit 23 detects a candidate plane from the three-dimensional map (Step 102). For example, the candidate plane detection unit 23 detects a plurality of candidate planes from a plane perpendicular to a predetermined axial direction (for example, the Z-axis direction). Further, the candidate plane detection unit 23 presents the detected candidate planes to the user 5 (Step 103). The user 5 selects a presented candidate plane (Step 104).

The reference point setting unit 24 sets a two-dimensional position of the reference point on the selected candidate plane (Step 105). For example, the reference point setting unit 24 sets the X coordinate and the Y coordinate in the candidate plane of the selected XY plane. Further, the reference point setting unit 24 moves the set two-dimensional position of the reference point in the perpendicular direction by a predetermined distance (Step 106). In other words, the reference point is set by Steps 105 and 106.

Note that the order of Steps 105 and 106 may be reversed. For example, the two-dimensional position of the reference point may be perpendicularly moved from the selected candidate plane and selected from the moved plane.

The operable range change unit 25 changes the scale of the operable range on the basis of the set reference point (Step 107).

The virtual viewpoint setting unit 26 sets the position of the virtual viewpoint on the basis of the reference point and the scale of the operable range (Step 108). For example, the virtual viewpoint setting unit 26 sets the virtual viewpoint at a position farther from the candidate plane than the reference point in the perpendicular direction.

Figure 4:
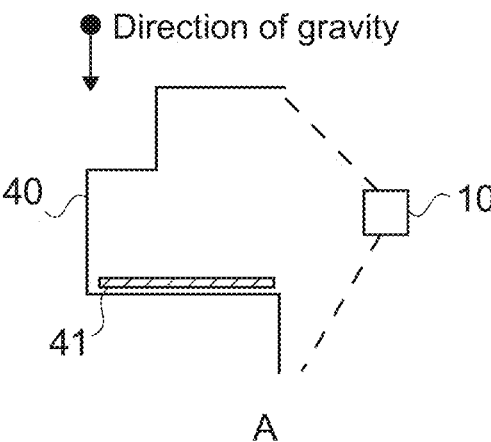
FIG. 4 is a schematic diagram showing the control of the virtual viewpoint and the operable range.
Figure 4:
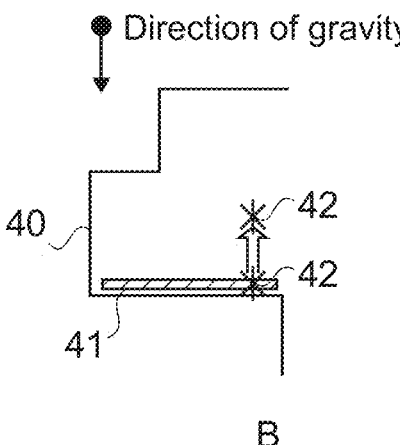
Figure 4:
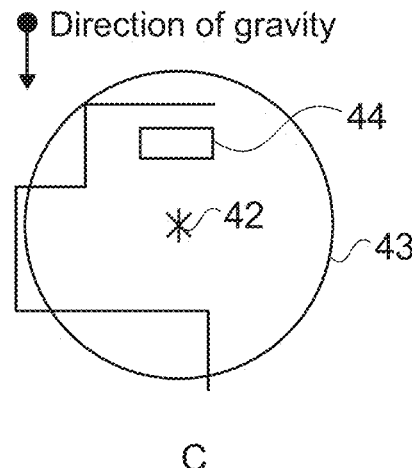

FIG. 4 is a schematic diagram showing the control of the virtual viewpoint and the operable range. In FIG. 4, a three-dimensional map is omitted for simplicity.

A of FIG. 4 is a schematic diagram showing Step 102. In other words, the sensor unit 14 of the mobile object 10 detects a candidate plane 41 from a measured three-dimensional map 40. For example, when a predetermined direction (direction of gravity) in the three-dimensional map 40 is set, a plane perpendicular to the direction of gravity is detected as the candidate plane 41.

B of FIG. 4 is a schematic diagram showing Steps 103 to 106.

The user selects the detected candidate plane 41 and sets a two-dimensional position of a reference point 42 on the selected candidate plane. Further, the user can set, as the reference point 42, a position perpendicularly moved from the set two-dimensional position by a predetermined distance.

C of FIG. 4 is a schematic diagram showing Steps 107 and 108.

The operable range change unit 25 changes the scale of an operable range 43 on the basis of the set reference point 42. For example, in C of FIG. 4, the operable range 43 with the scale to cover the three-dimensional map 40 around the reference point 32 is set. Further, the virtual viewpoint setting unit 26 sets a virtual viewpoint 44 at a position separated from the reference point 42 by a predetermined distance in a direction opposite to the direction of gravity.

Figure 5:
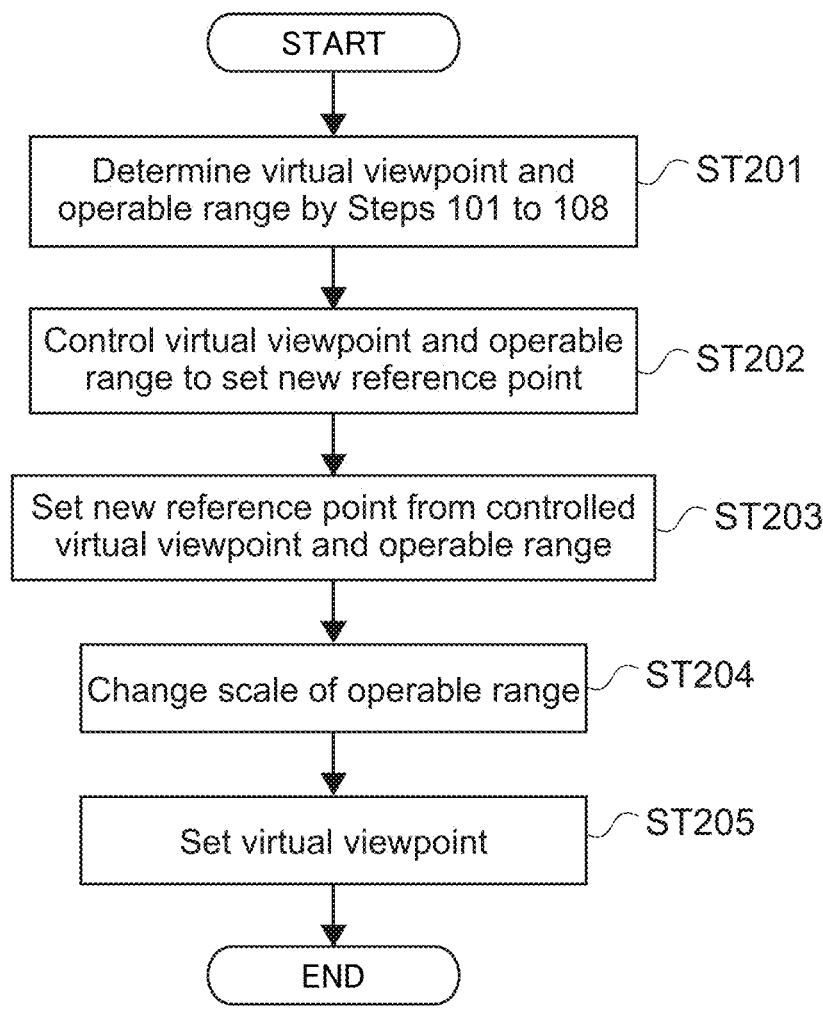
FIG. 5 is a flowchart showing the control for setting a new virtual viewpoint from a set virtual viewpoint.

FIG. 5 is a flowchart showing control for setting a new virtual viewpoint from the set virtual viewpoint.

From Steps 101 to 108 shown in FIG. 3, the position of the virtual viewpoint and the scale of the operable range are determined (Step 201). Here, the reference point, the virtual viewpoint, and the operable range determined in Step 201 are referred to as a first reference point, a first virtual viewpoint, and a first operable range for convenience. Further, a reference point, a virtual viewpoint, and an operable range to be newly determined are referred to as a second reference point, a second virtual viewpoint, and a second operable range.

The operable range change unit 25 and the virtual viewpoint setting unit 26 control the first virtual viewpoint and the first operable range in order to set a second reference point (Step 202). A specific method will be described with reference to FIG. 6.

The reference point setting unit 24 sets a new reference point from the controlled first virtual viewpoint and first operable range (Step 203). For example, a second reference point is set on the basis of the position or candidate plane selected by the user 5.

The operable range change unit 25 changes the scale of the second operable range (Step 204).

The virtual viewpoint setting unit 26 sets a second virtual viewpoint (Step 205). For example, the virtual viewpoint setting unit 26 sets the position of the virtual viewpoint on the basis of the position of the second reference point and the scale of the operable range.

The user 5 can move from the first virtual viewpoint to the second virtual viewpoint. In other words, the user 5 can visually recognize the three-dimensional map from the second virtual viewpoint.

Figure 6:
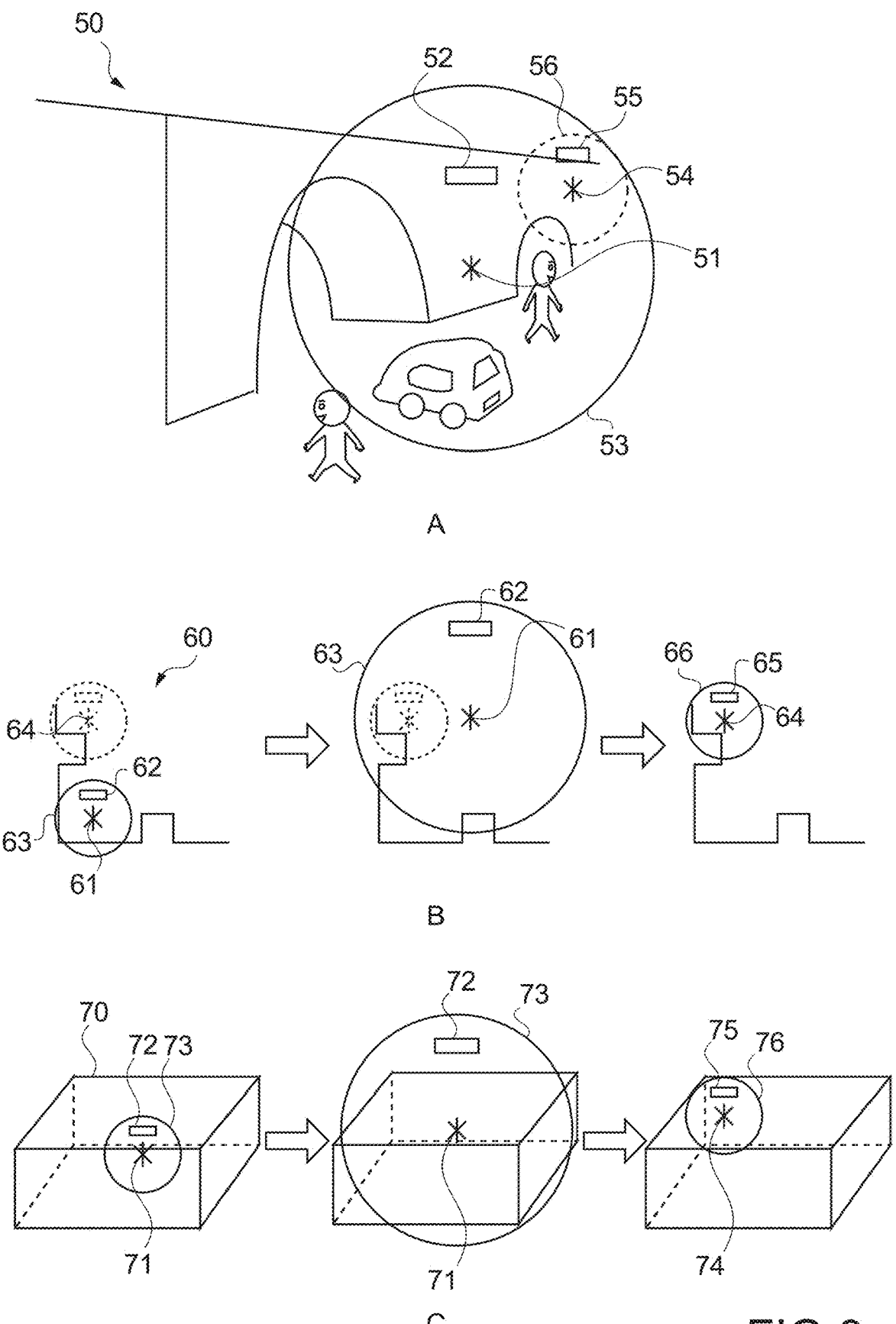
FIG. 6 is a schematic diagram showing control examples for setting a second reference point.

FIG. 6 is a schematic diagram showing a control example for setting the second reference point. In FIG. 6, an example of the control of the first virtual viewpoint and the first operable range will be described in order to set the second reference point of Step 202.

A of FIG. 6 is a schematic diagram for setting a second reference point 54 from a first operable range 53. The example shown in A of FIG. 6 is an example of a case where the position of the first virtual viewpoint and the scale of the first operable range are not controlled.

As shown in A of FIG. 6, a first reference point 51, a first virtual viewpoint 52, and the first operable range 53 are shown in a three-dimensional map 50. The user 5 visually recognizes the three-dimensional map 50 from the first virtual viewpoint 52, and can perform various operations through the controller 32 within the first operable range 53.

In this embodiment, the user 5 sets a second reference point 54 within the first operable range 53 through the controller 32. For example, the user 5 can set, by placing the hand holding the controller 32 in a predetermined position, that position as the coordinates of the second reference point 54.

Further, the user 5 controls a second virtual viewpoint 55 and a second operable range 56 from the set second reference point 54. For example, the user 5 controls the second virtual viewpoint 55 and the second operable range 56 through the controller 32. Specifically, the position of the second virtual viewpoint 55 may be set to the position of the hand holding the controller 32. Further, the scale of the second operable range 56 may be changed by various operations using the controller 32, such as drawing a circle with the controller 32.

B of FIG. 6 is a schematic diagram showing a control example for controlling the first virtual viewpoint and the first operable range. Further, in B of FIG. 6, a three-dimensional map is omitted for simplicity.

In the example shown in B of FIG. 6, an example is given in which the position of a second reference point 64 desired by the user 5 is farther than a first operable range 63. In other words, it is a control example of a case where the user 5 wants to set a position that cannot be set by the controller 32 as a second reference point.

In this case, the virtual viewpoint setting unit 26 sets the position of a first virtual viewpoint 62 such that the entire three-dimensional map 60 can be viewed in a bird's-eye view. For example, a position where the area in the XY plane, YZ plane, or XZ plane of the generated three-dimensional map falls within the angle of view of the HMD 31 (the field of view of the user 5) is set as the first virtual viewpoint 62.

In this case, the position of a first reference point 61 and the scale of the first operable range 63 are set to predetermined numerical values.

The user 5 sets the second reference point 64 in the first operable range 63 from the first virtual viewpoint 62, which is set so as to be able to view the entire three-dimensional map 60 in a bird's-eye view. The user 5 also controls a second virtual viewpoint 65 and a second operable range 66 from the set second reference point 64.

C of FIG. 6 is a schematic diagram showing another control example for controlling the first virtual viewpoint and the first operable range.

In the example shown in C of FIG. 6, a first operable range 73 is changed so as to encompass the generated entire three-dimensional map 70. In other words, this is another control example in which the user 5 wants to set a position that cannot be set by the controller 32 as a second reference point.

Further, in C of FIG. 6, the map generation unit 22 generates the three-dimensional map 70 of a rectangular parallelepiped.

The operable range change unit 25 changes the scale of the first operable range 73 on the basis of the size of the generated three-dimensional map 70. For example, the operable range change unit 25 changes the scale of the first operable range 73 on the basis of the volume of the rectangular parallelepiped encompassing the generated three-dimensional map 70.

In this case, the position of a first reference point 71 and the position of a first virtual viewpoint 72 are set to predetermined numerical values.

The user 5 sets a second reference point 74 within the first operable range 73 from the first virtual viewpoint 72 set to encompass the entire three-dimensional map 70. Further, the user 5 also controls a second virtual viewpoint 75 and a second operable range 76 from the set second reference point 74.

Note that the control example for setting the second reference point is not limited, and for example, the center of gravity of the generated three-dimensional map may be set as the first reference point, and control may be performed to have the preset position of the first virtual viewpoint and the preset scale of the first operable range.

Figure 7:
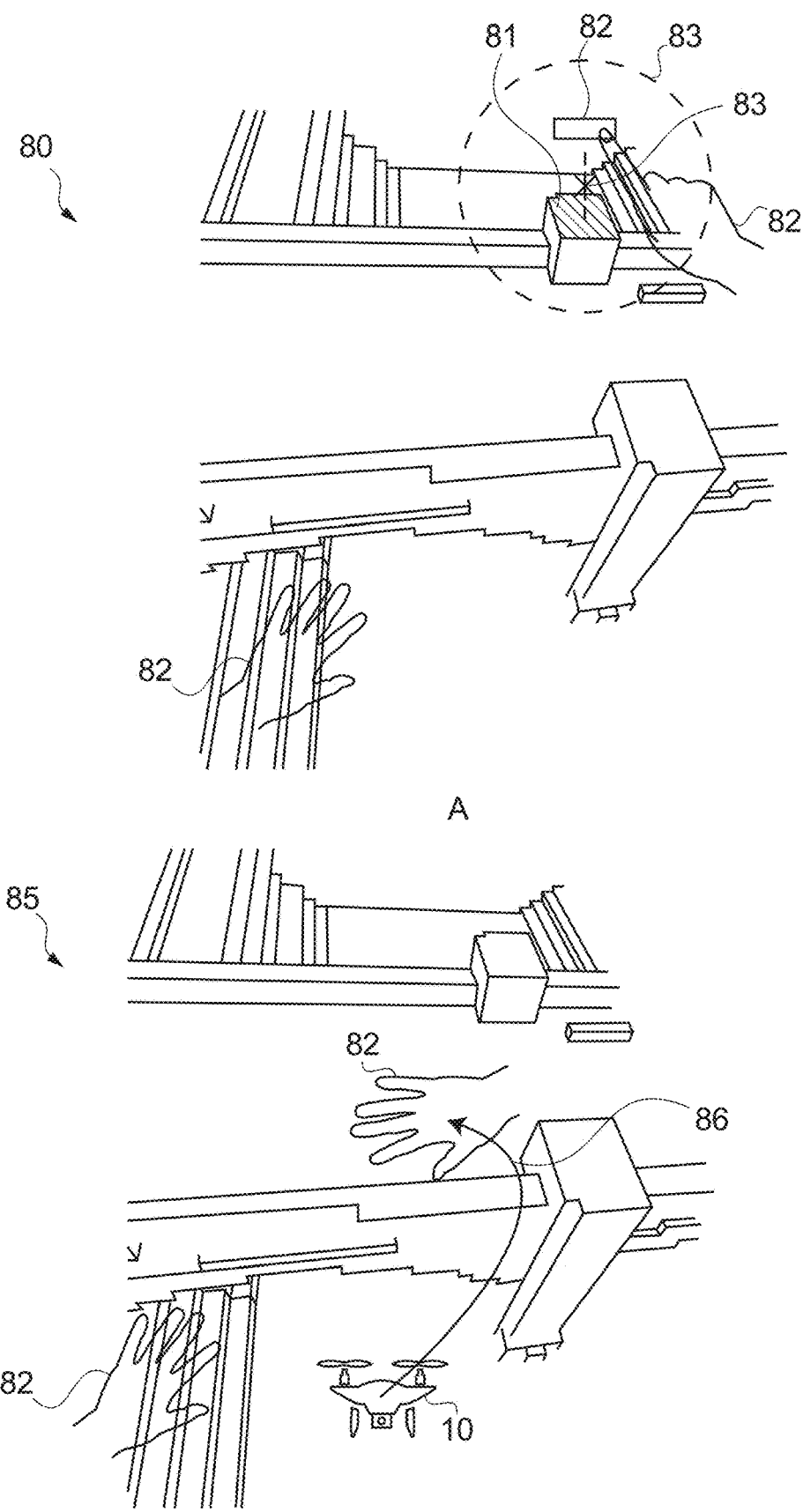
FIG. 7 is a schematic diagram showing examples of GUIs.

FIG. 7 is a schematic diagram showing examples of GUIs.

As shown in FIG. 7, the GUI presentation unit 27 presents various GUIs. FIG. 7 is a diagram showing a state in which the user 5 observes the three-dimensional map generated by the map generation unit 22 from the first virtual viewpoint. Further, in FIG. 7, a virtual controller having a shape of a hand is displayed on the three-dimensional map at a position corresponding to the position of the controller 32 used by the user 5.

A of FIG. 7 is a schematic diagram showing an example of a control GUI for controlling a virtual viewpoint and an operable range.

As shown in A of FIG. 7, a control GUI 80 presents a detected candidate plane 81 so as to control the second virtual viewpoint and the second operable range. The user 5 can select the candidate plane 81 via a virtual controller 82. For example, the user 5 can select the candidate plane 81 by moving the hand (the controller 32) so as to superimpose the virtual controller 82 on the candidate plane 81.

Further, the user 5 can set a second reference point 83 from the selected candidate plane 81. For example, the distance at which the virtual controller 82 is moved from the selected candidate plane 81 is the position of the second reference point 83. Similarly, the user 5 can control a second virtual viewpoint 84 and a second operable range 86.

Note that the display and the operation for controlling the virtual viewpoint and the operable range are not limited. For example, a plurality of detected candidate planes may be presented to the user 5 so as to blink. Further, for example, the control of the reference point, the virtual viewpoint, and the operable range may be executed for each shape of the virtual controller 82, such as a state in which the index finger is extended or a state in which the hand is opened.

Note that the shape of the virtual controller 82 is not limited. For example, the shape may imitate the shape of the controller 32.

B of FIG. 7 is a schematic diagram showing an example of a path GUI for generating a path of a mobile object 10.

The user 5 generates a path 86 of the mobile object 10 via a path GUI 85. For example, the user 5 generates a trajectory obtained when a virtual controller 82 is moved as a path of the mobile object 10. In this embodiment, the path of the mobile object 10 is generated by the virtual controller 82 representing the right hand of the user 5.

Note that various operations of the mobile object 10 may be performed via the path GUI 85. For example, the imaging timing of a camera mounted on the mobile object 10 may be set. Further, for example, a speed, a flight pattern, and the like of the mobile object 10 may be controlled. In other words, it is possible to control a trajectory, a speed, and the like defined as a pattern, such as turning or flying in a figure eight. For example, a speed, a curvature, and the like of the mobile object 10 when turning or flying in a figure eight is performed can be set for the flight pattern such as turning or flying in a figure eight.

Parameters, such as a speed and a posture, associated with the flight pattern may be set by default. In other words, how to move in a predetermined flight pattern may be set by default.

Further, the virtual viewpoint when the control GUI 80 and the path GUI 85 are operated may be set at the position of the camera mounted on the mobile object 10. In this case, the user 5 can visually recognize a three-dimensional map or an image actually captured from the angle of view of the camera. In the case where the camera mounted on the mobile object 10 is a 360-degree camera, it is also possible to rotate the field of view in accordance with an operation by the user 5.

As described above, the information processing method according to the first embodiment controls the setting of the virtual viewpoint 6 of the user 5 with respect to the three-dimensional map and the setting of the operable range 7 in which the operation relating to the three-dimensional map can be performed by the user 5 with respect to the three-dimensional map. This makes it possible to exhibit high intuitiveness in operation.

Conventionally, the operation of a mobile object from a subjective viewpoint has a limited field of view, and it is necessary to perform a complicated operation after understanding the motion characteristics of the mobile object. On the other hand, prior flight planning using a map needs global positioning system or global positioning satellite (GPS) or needs to have a map in advance, which can be applied to limited situations. In addition, paths specified using prior maps are often two-dimensional.

In this regard, in the present technology, an operable range in which a user's virtual viewpoint and a user's operation relating to a space, which are set in the space, can be performed is controlled. Thus, even when a spatial map is not obtained in advance, the path of the mobile object can be specified in the three-dimensional range. Further, it is possible to flexibly select a virtual viewpoint or an operable range, and it is possible to obtain a range of a place to be specified or a required specified accuracy.

Second Embodiment

A virtual representation system of a second embodiment according to the present technology will be described. In the following description, description of the portions similar to configurations and actions in the virtual representation system described in the above embodiment will be omitted or simplified.

In the first embodiment, the reference point is set from the candidate plane. In the second embodiment, a virtual viewpoint is set from the candidate plane. Further, after the virtual viewpoint is set, the scale of an operable range is changed.

Figure 8:
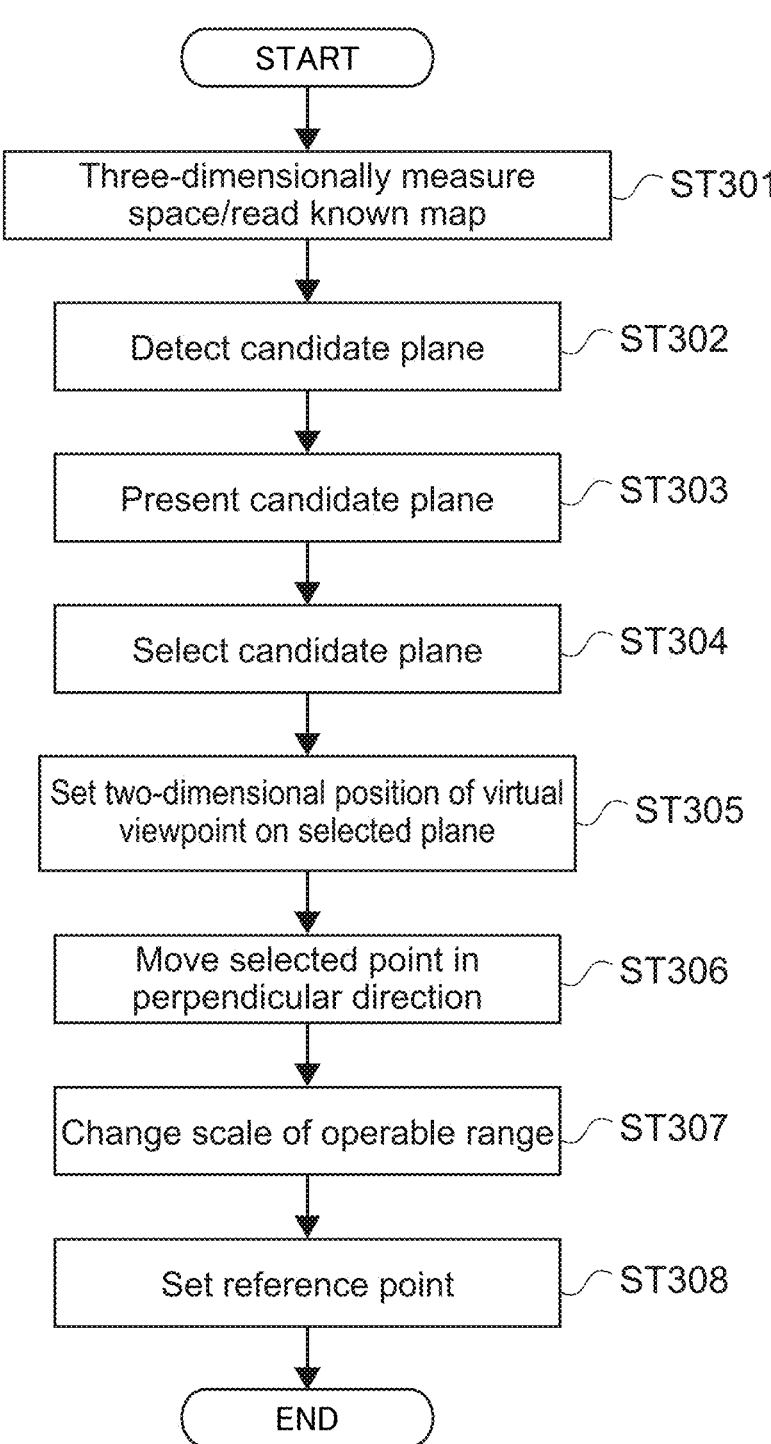
FIG. 8 is a flowchart showing another example of the control of the virtual viewpoint and the operable range.

FIG. 8 is a flowchart showing another example of control of the virtual viewpoint and the operable range.

The sensor unit 14 of the mobile object 10 performs three-dimensional measurement of the real space (Step 301). Alternatively, the information acquisition unit 21 reads a known map prepared in advance. The map generation unit 22 generates a three-dimensional map on the basis of the sensing result of the sensor unit 14.

The candidate plane detection unit 23 detects a candidate plane from the three-dimensional map (Step 302). For example, the candidate plane detection unit 23 detects a plurality of candidate planes from a plane perpendicular to a predetermined axial direction. Further, the candidate plane detection unit 23 presents the detected candidate planes to the user 5 (Step 303). The user 5 selects a presented candidate plane (Step 304).

The virtual viewpoint setting unit 26 sets a two-dimensional position of a virtual viewpoint on the selected candidate plane (Step 305). For example, the virtual viewpoint setting unit 26 sets the X coordinate and the Y coordinate in the selected candidate plane (XY plane). Further, the virtual viewpoint setting unit 26 moves the set two-dimensional position of the virtual viewpoint in the perpendicular direction by a predetermined distance (Step 306). In other words, the virtual viewpoint is set by Steps 305 and 306.

Note that the order of Steps 305 and 306 may be reversed. For example, the two-dimensional position of the virtual viewpoint may be perpendicularly moved from the selected candidate plane and set from the moved plane.

The operable range change unit 25 changes the scale of the operable range on the basis of the set virtual viewpoint (Step 307).

The reference point setting unit 24 sets the position of the reference point on the basis of the position of the virtual viewpoint and the scale of the operable range (Step 308). For example, the reference point setting unit 24 sets the position of the reference point at the center of the operable range or at the same position as the two-dimensional position of the virtual viewpoint and at a position separated by a predetermined distance in the perpendicular direction of the candidate plane.

Note that the order of Steps 307 and 308 may be reversed. For example, the operable range change unit 25 may change the operable range on the basis of the position of the virtual viewpoint and the position of the reference point.

Note that a table in which the scale of the operable range and the position of the reference point are associated with the position of the virtual viewpoint may be prepared in advance. In this case, the scale of the operable range and the position of the reference point are uniquely determined by setting the virtual viewpoint.

In the first embodiment, a plane perpendicular to the direction of gravity is detected as the candidate plane. Without being limited to this, any plane of the three-dimensional map may be detected as the candidate plane.

Figure 9:
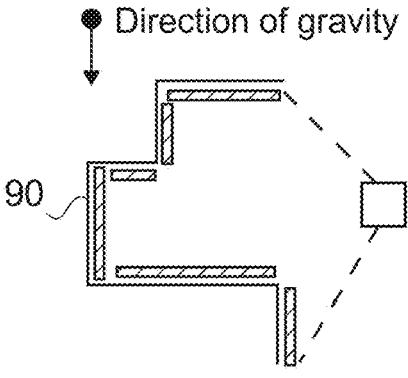
FIG. 9 is a schematic diagram showing examples of selection of a candidate plane.
Figure 9:
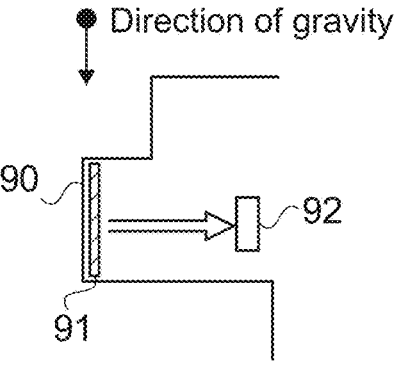
Figure 9:
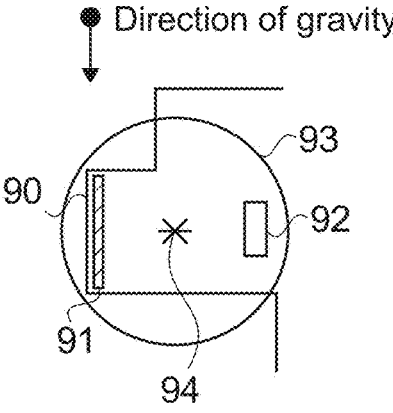

FIG. 9 is a schematic diagram showing an example of selection of the candidate plane. Note that, in FIG. 9, a three-dimensional map is omitted for simplicity.

A of FIG. 9 is a schematic diagram showing detection of the candidate plane.

The candidate plane detection unit 23 detects any plane of a three-dimensional map 90 as the candidate plane. In this embodiment, a plurality of candidate plans is detected corresponding to the respective planes of the three-dimensional map 90.

B of FIG. 9 is a schematic diagram showing the position of a reference point.

The user selects a detected candidate plane 91 and sets a two-dimensional position of a virtual viewpoint 92 on the selected candidate plane 91. Further, the user can set a position perpendicularly moved from the set two-dimensional position by a predetermined distance as the virtual viewpoint 92.

C of FIG. 9 is a schematic diagram showing the control of the operable range and the reference point.

The operable range change unit 25 changes the scale of an operable range 93 on the basis of the set virtual viewpoint. Further, the reference point setting unit 24 sets a reference point 94 at a position separated from the virtual viewpoint 92 by a predetermined distance in the direction toward the candidate plane 91. Alternatively, the reference point setting unit 24 may set the reference point 94 at the center of the operable range 93.

Figure 10:
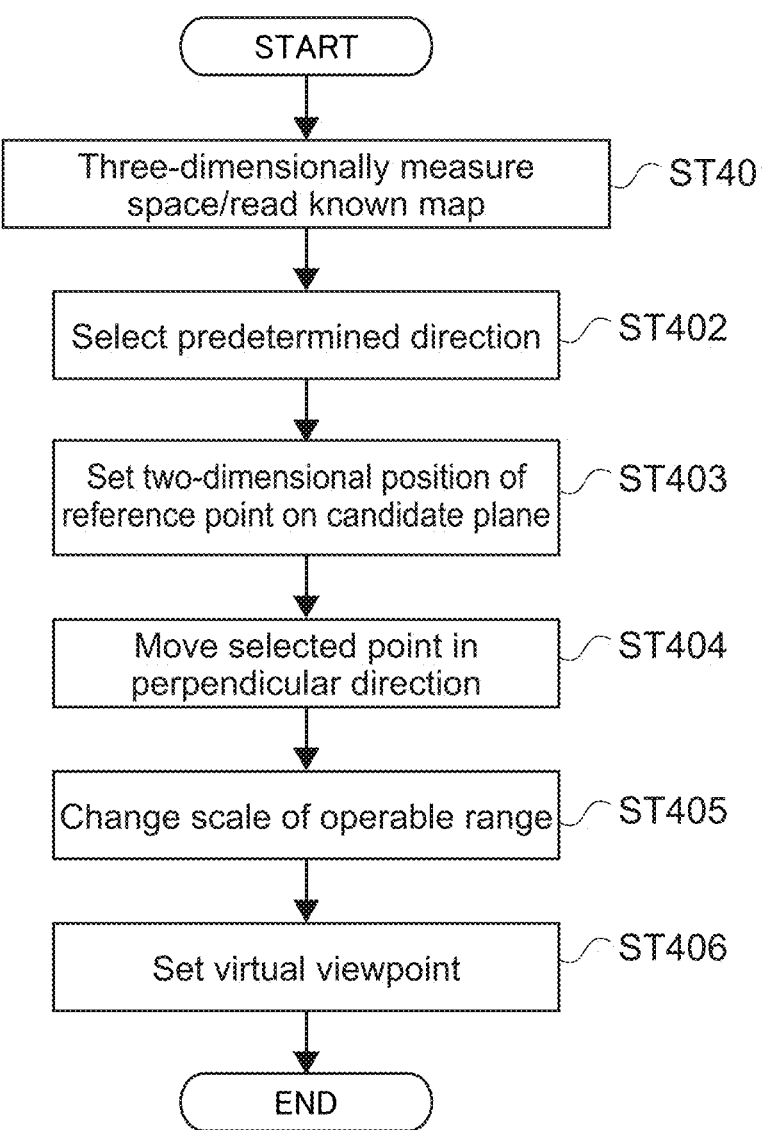
FIG. 10 is a flowchart showing another example of the control of the virtual viewpoint and the operable range.

FIG. 10 is a flowchart showing another example of the control of the virtual viewpoint and the operable range.

FIG. 10 shows an example in which the candidate plane is determined by selecting a predetermined direction in the three-dimensional map. For example, if a plane perpendicular to the direction of gravity is automatically selected when the direction of gravity is selected, the user does not need to perform the control to select the candidate plane.

The sensor unit 14 of the mobile object 10 performs three-dimensional measurement of the real space (Step 401). Alternatively, the information acquisition unit 21 reads a known map prepared in advance. The map generation unit 22 generates a three-dimensional map on the basis of the sensing result of the sensor unit 14.

The user 5 selects a predetermined direction from the three-dimensional map (Step 402). The candidate plane detection unit 23 selects a candidate plane on the basis of the selected predetermined direction.

The reference point setting unit 24 sets a two-dimensional position of a reference point on the selected candidate plane (Step 403).

Further, the reference point setting unit 24 moves the set two-dimensional position of the reference point in the perpendicular direction by a predetermined distance (Step 404).

The operable range change unit 25 changes the scale of the operable range on the basis of the set reference point (Step 405).

The virtual viewpoint setting unit 26 sets the position of the virtual viewpoint on the basis of the reference point and the scale of the operable range (Step 406).

Third Embodiment

In the first embodiment, the user 5 can observe the three-dimensional map from the virtual viewpoint and execute various operations by using the virtual controller. In a third embodiment, the GUI presentation unit 27 presents a GUI representing a virtual body including a virtual viewpoint of a user and a virtual controller.

Figure 11:
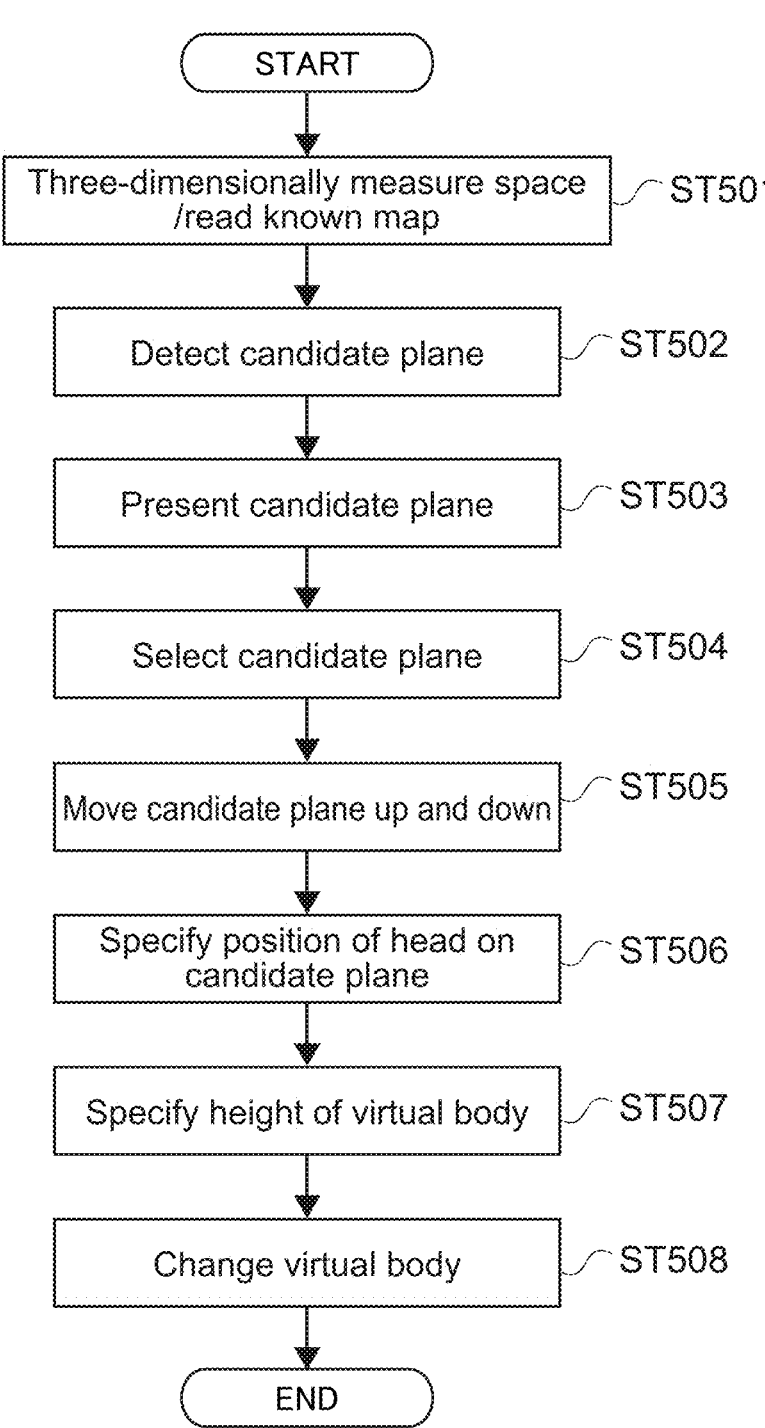
FIG. 11 is a flowchart showing a control example of setting of a virtual body.

FIG. 11 is a flowchart showing an example of control of setting of the virtual body.

The sensor unit 14 of the mobile object 10 performs three-dimensional measurement of the real space (Step 501). Alternatively, the information acquisition unit 21 reads a known map prepared in advance. The map generation unit 22 generates a three-dimensional map on the basis of the sensing result of the sensor unit 14.

The candidate plane detection unit 23 detects a candidate plane from the three-dimensional map (Step 502). For example, the candidate plane detection unit 23 detects a plurality of candidate planes from a plane perpendicular to a predetermined axial direction. Further, the candidate plane detection unit 23 presents the detected candidate planes to the user 5 (Step 503). The user 5 selects a presented candidate plane (Step 504).

The virtual viewpoint setting unit 26 moves the selected candidate plane on the axis (Step 505). For example, the candidate plane is moved in a positive or negative direction on the axis according to a predetermined axis, such as the direction of gravity, set by the user 5.

Further, the virtual viewpoint setting unit 26 specifies a two-dimensional position of the head (virtual viewpoint) of the virtual body on the moved candidate plane (Step 506).

The operable range change unit 25 specifies the height of the virtual body (Step 507).

The virtual body has the head including a virtual viewpoint, a torso, both arms, and both legs. In particular, the arms include both hands that are virtual controllers. For example, the user 5 can operate the hand of the virtual body by moving the controller. In other words, the length of the arm of the virtual body is the scale of the operable range. The virtual body can also be referred to as an avatar of the user 5.

In this embodiment, the lengths of both arms are set in advance on the basis of the height of the virtual body. For example, a table in which the height and the lengths of both arms are associated with each other, and the like are recorded, and the operable range change unit 25 changes the lengths of both arms (scale of the operable range) from the specified height according to the table. Of course, the present technology is not limited to this. For example, the height of the virtual body and the lengths of the arms thereof may be determined according to the relationship between the position of the HMD 31 worn by the user 5 and the position of the controller 32.

The virtual viewpoint setting unit 26 and the operable range change unit 25 set the virtual body on the basis of the specified virtual body (Step 508).

Note that the method of setting the virtual body is not limited. For example, instead of Step 506, the standing position of the virtual body on the candidate plane may be specified. Further, for example, the virtual viewpoint and operable range may be set according to a predetermined algorithm by specifying the height of the virtual body. Further, for example, the position of the head of the virtual body may be specified from the two-dimensional position of the candidate plane.

Figure 12:
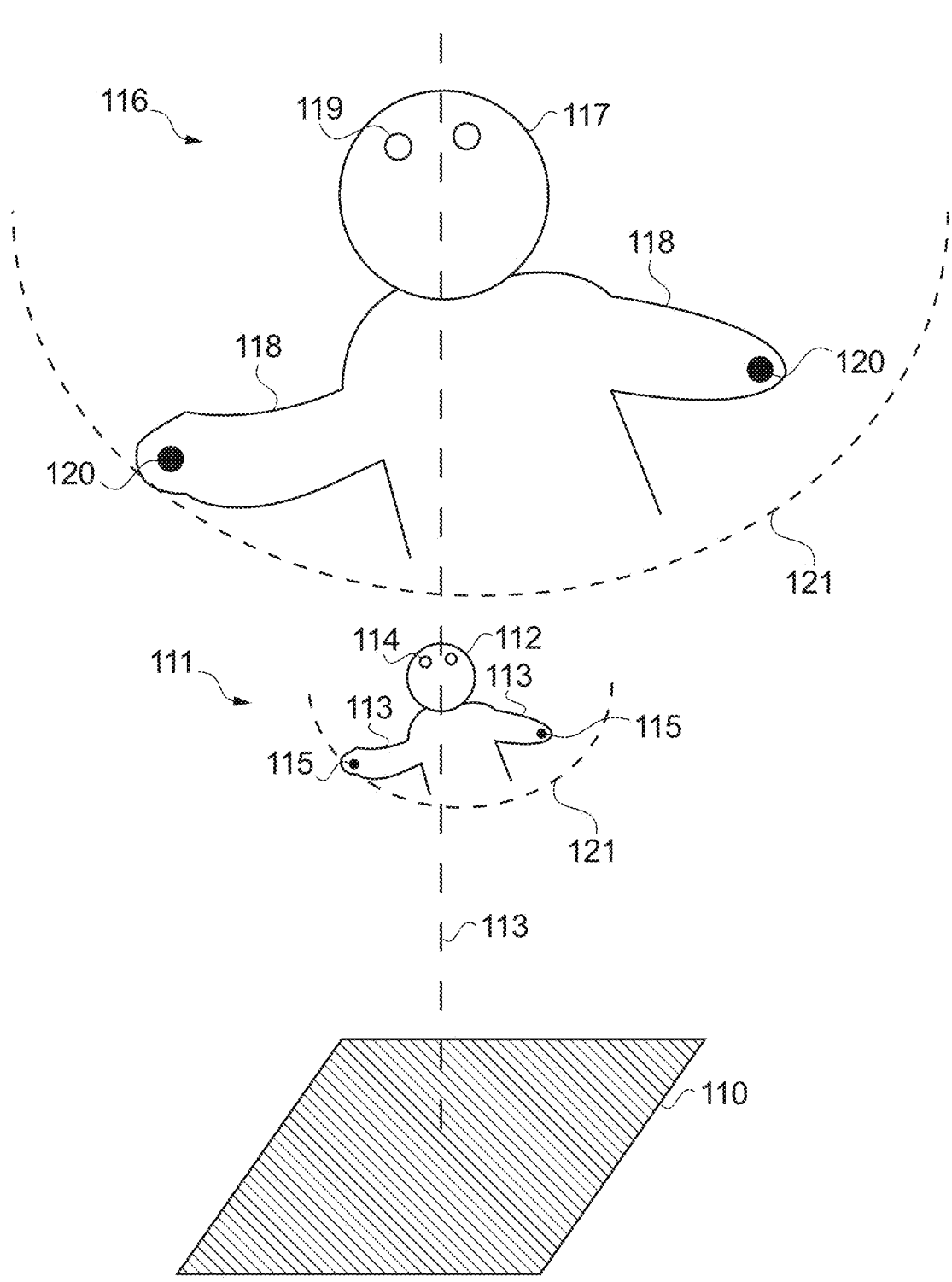
FIG. 12 is a schematic diagram showing an example of the virtual body.

FIG. 12 is a schematic diagram showing an example of the virtual body. Note that, in FIG. 12, the lower body of the virtual body, such as the waist and the legs, is omitted.

As shown in FIG. 12, the user 5 specifies the position of a head 112 of a virtual body 111 on a candidate plane 110. For example, the user 5 sets the center of the head 112 of the virtual body 111 on a predetermined axis 113 on the candidate plane 110.

The user 5 specifies the height of the virtual body. For example, the height may be specified such that the foot of the virtual body 111 comes into contact with the candidate plane 110. Further, in this embodiment, the size of the virtual body is determined by specifying the height of the virtual body. For example, as the height of a virtual body 116 increases, a head 117, the lengths of both arms 118, and the like of the virtual body 116 are determined to increase. Similarly, as the height of the virtual body 111 (smaller one) decreases, the head 112, the lengths of the arms 113, and the like of the virtual body 111 are determined to decrease.

Further, the position of an eye 114 (119) of the virtual body 111 (116) may also be determined on the basis of the height of the virtual body. For example, an interpupillary distance may be acquired from the HMD 31 worn by the user 5, and the position of the eye (virtual viewpoint) of the virtual body may be determined from the positional relationship between the position (height) of the HMD 31 and the interpupillary distance.

In other words, the position of the virtual viewpoint and the scale of the operable range, which correspond to the height of the virtual body, may be associated with each other.

A hand 115 (120) of the virtual body 111 (116) has the function of a virtual controller. The user 5 can select a candidate plane or generate a path of the mobile object 10, for example, by using the hand 115 (120) of the virtual body 111 (116).

For example, when the user 5 extends the arms to the maximum, the virtual body 111 (116) also extends the arms 113 (118) to the maximum. At that time, the lengths of the arms 113 (118) of the virtual body 111 (116) become an operable range 121 of the user 5. In this case, the scale of the operable range 121 is changed on the basis of the height of the virtual body. Of course, if the arm is short (the height of the virtual body is small), the scale of the operable range 121 also decreases.

Note that the control of the virtual viewpoint and the operable range in the virtual body is not limited. For example, even if the height of the virtual body is small, the arm of the virtual body may be set long. Further, for example, the operable range may be set to be equal to or larger than the lengths of the arms of the virtual body. In this case, when the user 5 tilts the body, a gyro-sensor or the like mounted on the HMD 31 may acquire information about the tilt of the body, and the virtual body may be tilted in the similar manner.

Figure 13:
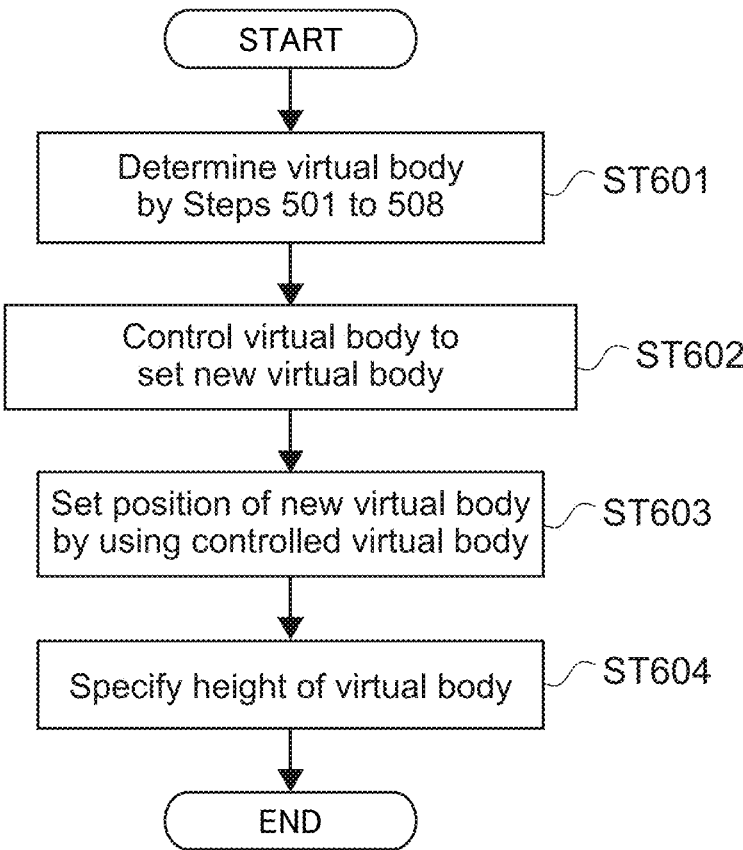
FIG. 13 is a flowchart showing a control example for setting a new virtual body from the virtual body.

FIG. 13 is a flowchart showing a control example for setting a new virtual body from the virtual body.

The height of the virtual body is determined by Steps 501 to 508 shown in FIG. 11 (Step 601). In other words, the position of the virtual viewpoint and the scale of the operable range are determined.

Here, the virtual body determined in Step 601 will be referred to as a first virtual body for convenience. Further, a virtual body to be newly determined will be referred to as a second virtual body.

The operable range change unit 25 and the virtual viewpoint setting unit 26 control the first virtual body in order to set a new virtual body (Step 602).

The position of the second virtual body is set by the operation of the user 5 via the virtual body (Step 603). A specific method will be described with reference to FIG. 14.

The user 5 specifies the height of the second virtual body (Step 604). Specifically, the operable range change unit 25 and the virtual viewpoint setting unit 26 control the virtual viewpoint and the operable range on the basis of the specified height of the virtual body.

The user 5 can change the operation from the first virtual body to the second virtual body. In other words, various operations can be performed using the second virtual body.

Figure 14:
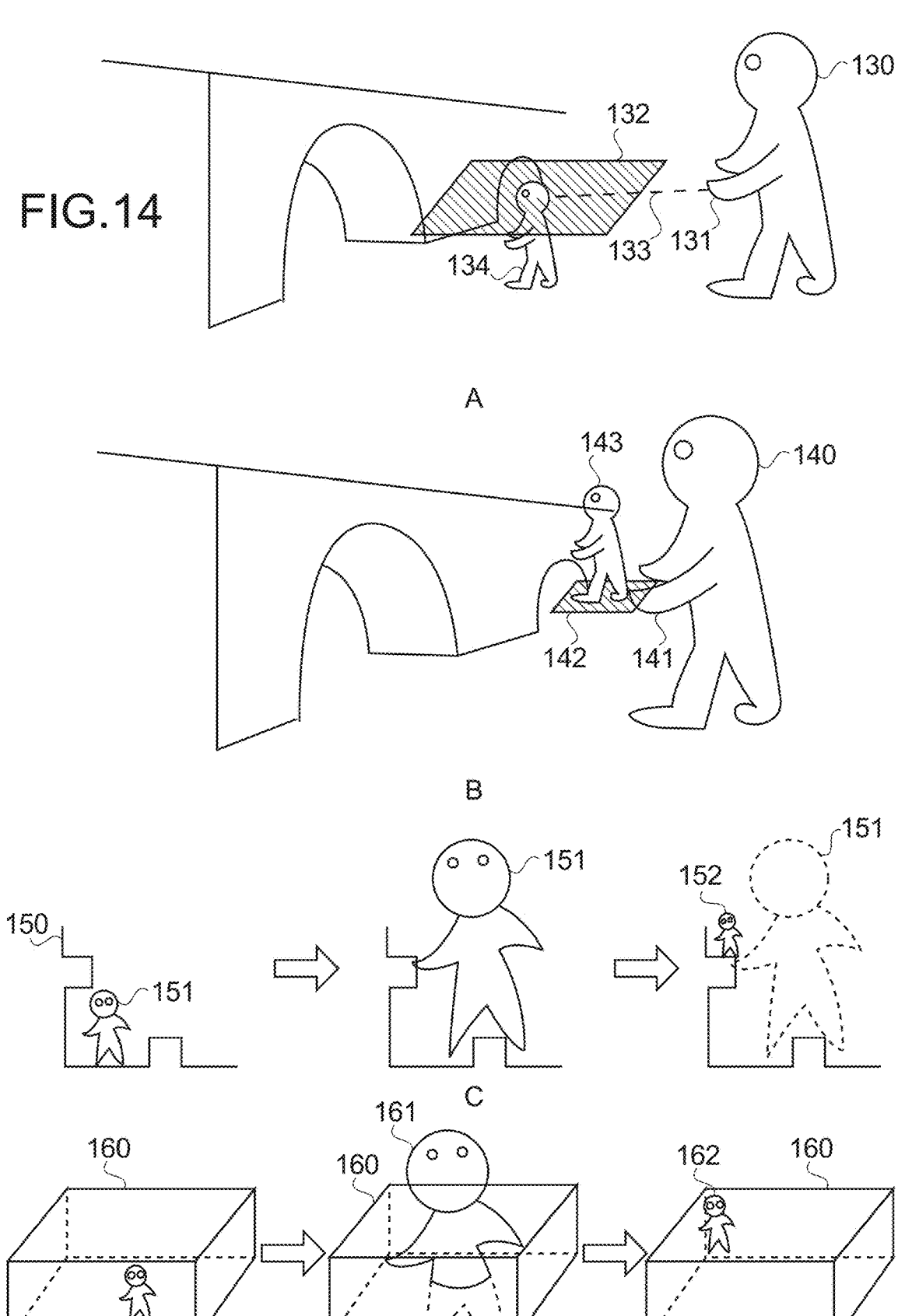
FIG. 14 is a schematic diagram showing control examples for setting a second virtual body.

FIG. 14 is a schematic diagram showing control examples for setting the second virtual body. In FIG. 14, a specific example in Steps 602 and 603 will be described.

A of FIG. 14 is a schematic diagram when the virtual body is set on the candidate plane.

As shown in A of FIG. 14, the user 5 can select a point that a first virtual body 130 specifies with a finger 131 (virtual controller) as a candidate plane 132. For example, the user 5 can select a linear position from the hand 131 of the virtual body 130 as a candidate plane. In this case, the GUI presentation unit 27 presents a state in which a dotted line 133 such as a laser pointer is emitted from the hand 131 of the virtual body 130. When such a dotted line 133 intersects with a plane in the three-dimensional map, the candidate plane 132 is selected.

A second virtual body 134 is set from the selected candidate plane according to Steps 505 to 508.

B of FIG. 14 is a schematic diagram showing an example of setting the candidate plane.

As shown in B of FIG. 14, the user 5 can generate a candidate plane 142 using a hand 141 of a first virtual body 140. For example, when the user 5 moves the hand 141 of the virtual body 140 so as to draw a square in the air, the square can be generated as the candidate plane 142.

The standing position and height of a second virtual body 143 are specified from the generated candidate plane, thereby setting the second virtual body 143.

Note that the method of generating the candidate plane is not limited. For example, the user 5 uses the controller 32 to select a candidate plane generation mode to generate a candidate plane at any position. Further, for example, a candidate plane may be generated by executing a predetermined operation such as expanding the hand of the virtual body.

C of FIG. 14 is a schematic diagram showing a control example of controlling the first virtual body. Further, in C of FIG. 14, a three-dimensional map is omitted for simplicity.

In the example shown in C of FIG. 14, a second virtual body is set at a position that is out of reach of a first virtual body 150.

As shown in C of FIG. 14, the first virtual body is controlled so as to be able to view the entire three-dimensional map 150 in a bird's-eye view. For example, the virtual viewpoint setting unit 26 sets, as the position of the eye of the first virtual body 151 (the position of the virtual viewpoint), a position where the area in the XY plane, YZ plane, or XZ plane of the generated three-dimensional map 150 falls within the angle of view of the HMD 31. Further, for example, the operable range change unit 25 may set the lengths of the arms of the first virtual body (scale of the operable range) on the basis of the volume of the rectangular parallelepiped encompassing the generated three-dimensional map 150.

The user 5 sets a second virtual body 152 via the controlled first virtual body 151. For example, the location specified by the hand of the first virtual body 151 may be set as the candidate plane or the position of the head of the second virtual body 152.

D of FIG. 14 is a schematic diagram showing a control example of controlling a first virtual body.

In D of FIG. 14, a first virtual body 161 is enlarged such that the arms of the first virtual body 161 reach the entire three-dimensional map 160. Specifically, the operable range change unit 25 changes the scale of the operable range on the basis of the size of the three-dimensional map 160. In other words, the length of the arm of the first virtual body 161 is changed. Further, the height of the first virtual body 161 is determined on the basis of the changed length of the arm of the first virtual body 161.

In this case, a part of the controlled first virtual body 161 may interfere with the three-dimensional map 160. For example, in D of FIG. 14, the lower body of the first virtual body 161 may be depicted (expressed) as penetrating the three-dimensional map 160.

The user 5 sets a second virtual body 162 via the controlled first virtual body 161.

Here, an example of an algorithm for determining the position at the time of operation using the virtual body will be shown. Note that the position in this algorithm indicates the position of the user's eye and the position of the virtual viewpoint, or the position of the controller and the position of the virtual controller.

When a virtual body is set, a user's position $Pr0$ in the reality at that time, a user's position $Pv0$ in the three-dimensional map at that time, and a scale $S$ of the virtual body are determined.

Further, when the user operates a virtual body to move a hand or move, for example, a current user's position $Prc$ in the reality and a current user's position $Pvc$ in the three-dimensional map are measured.

The scale of the virtual body indicates a magnification of the set virtual body. For example, when the height of the user is assumed to be 1, the height of the set virtual body is S. Specifically, when the user is 170 cm tall and the height of the virtual body is enlarged to 340 cm, the scale is 2.

Here, the equation for determining the current user's position $Pvc$ in the three-dimensional map is represented as follows.

$$Pvc = S \times (Prc - Pr0) + Pv0$$

The above equation is performed for each rendered frame. Thus, the virtual controller can be operated in conjunction with the operation of the controller 32 by the user 5.

This allows an intuitive operation even in a virtual space such as a three-dimensional map.

Further, since the operable range is set to the range within the reach of the controller held by the user, that is, the range within the reach of the user, it is possible to use the physical spatial perception ability of a human. Therefore, the three-dimensional position and posture can be accurately specified at low learning cost with less time and effort.

Other Embodiments

The present technology is not limited to the embodiments described above and can achieve various other embodiments.

In the above embodiments, the virtual viewpoint is used as the eye of the virtual body, and the operable range is used as the lengths of the arms of the virtual body. The present technology is not limited to the above, and the coordinates of the reference point may be set as the position of the waist of the virtual body.

In the above embodiments, the virtual viewpoint is set within the operable range. The present technology is not limited to the above, and the virtual viewpoint may be set at any position outside the operable range.

In the above embodiments, the virtual body is set on the candidate plane based on the direction of gravity. The present technology is not limited to the above, and the virtual body may be set on any candidate plane. For example, the virtual body may be set such that both feet are in contact with a wall or ceiling. In this case, the user does not have to look upward when viewing the ceiling of the three-dimensional map from the virtual viewpoint. In other words, the physical burden on the user can be reduced.

In the above embodiments, the virtual viewpoint and the operable range are determined by specifying the height of the virtual body. The present technology is not limited to the above, and the virtual body may be determined on the basis of the size of the three-dimensional map.

Figure 15:
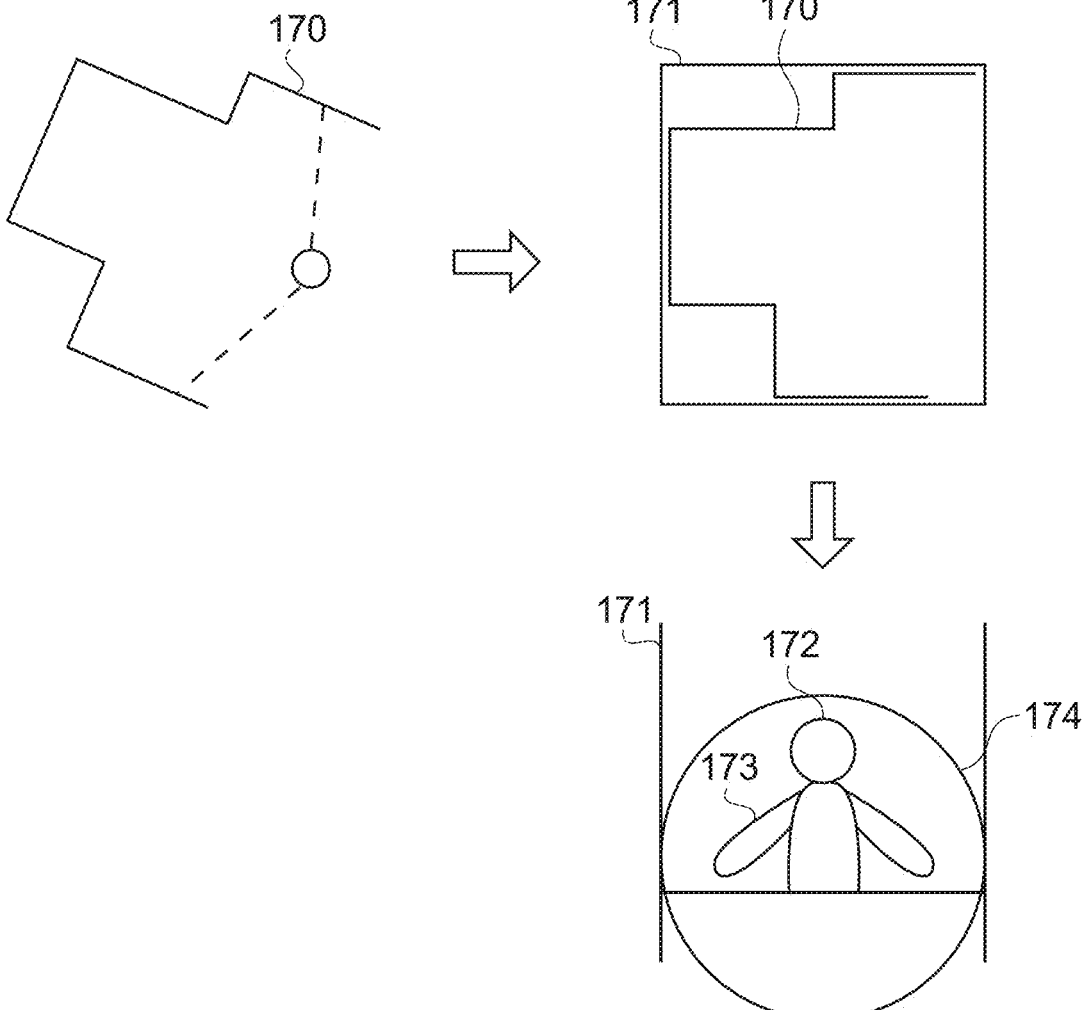
FIG. 15 is a schematic diagram showing a setting example of the virtual body.

FIG. 15 is a schematic diagram showing a setting example of a virtual body.

As shown in FIG. 15, the map generation unit 22 generates a three-dimensional map 170 on the basis of the sensing result acquired by the sensor unit 14 mounted on the mobile object 10.

The candidate plane detection unit 23 detects a candidate plane 171 encompassing the three-dimensional map 170. For example, the candidate plane detection unit 23 detects the candidate plane 171 on the basis of the area in the XY plane, YZ plane, or XZ plane of the three-dimensional map.

The reference point setting unit 24 sets a reference point at the center of gravity of the detected candidate plane. In this embodiment, the coordinates of the set reference point are set at the height of the waist of the virtual body.

The operable range change unit 25 changes the operable range on the basis of the size of the three-dimensional map 170. For example, the operable range change unit 25 sets, as an operable range 174, the length that the virtual body reaches when moving by taking a step from the state in which both arms 173 of the virtual body 172 are extended.

The height of the virtual body 172 is determined from the height of the waist and the lengths of the arms of the set virtual body.

In the above embodiments, the reference point, the virtual viewpoint, and the operable range are controlled from the candidate plane. The present technology is not limited to the above, and control may be performed such that a region specified by the user becomes an operable range.

Figure 16:
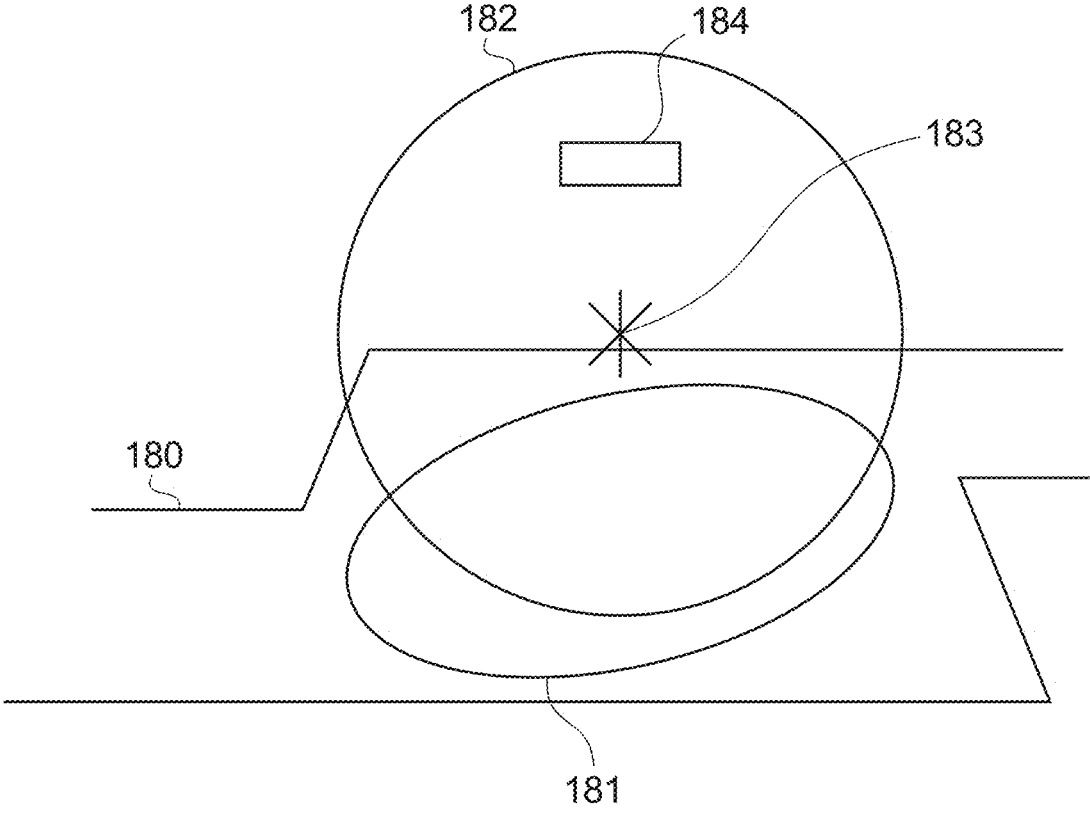
FIG. 16 is a schematic diagram showing another example of the control of the virtual viewpoint and the operable range.

FIG. 16 is a schematic diagram showing another example of the control of the virtual viewpoint and the operable range.

As shown in FIG. 16, the user 5 specifies a region 181 to be operated in a three-dimensional map 180 generated by the map generation unit 22.

The operable range change unit 25 changes the scale of an operable range 182 such that the specified region 181 is included. For example, the scale of the operable range 182 is changed so as to coincide with the long axis of a cylinder with the region 181 as the bottom surface.

The reference point setting unit 24 sets a reference point 183 on the basis of the changed operable range 182. For example, the reference point setting unit 24 sets the center of the operable range 182 as the reference point 183.

The virtual viewpoint setting unit 26 sets the position of a virtual viewpoint 184 on the basis of the scale of the operable range 182 and the position of the reference point.

Alternatively, the height of the virtual body may be determined such that a hand of the virtual body reaches the specified region 181. In this case, the scale of the operable range 182 changed by the operable range change unit 25 is the length of the arm of the virtual body. Further, the position of the reference point 183 set by the reference point setting unit 24 is the height of the waist of the virtual body. Further, the position of the virtual viewpoint 184 set by the virtual viewpoint setting unit 26 is the head of the virtual body.

In the above embodiments, the map generation unit 22 generates the three-dimensional map. The present technology is not limited to the above, and the map generation unit 22 may be mounted on the mobile object 10. In other words, a three-dimensional map may be generated by the mobile object 10, and the three-dimensional map may be supplied to the information processing apparatus 20.

In the above embodiments, the virtual body is used to represent an operation of the user 5 and an image of a virtual viewpoint. The present technology is not limited to the above, and any representation may be performed. For example, a three-dimensional map may be observed from a viewpoint of a bird flying at the same height (the same Z coordinate) as the virtual viewpoint.

In the above embodiments, the HMD 31 is used as the user device 30. The present technology is not limited to the above, and a terminal in the form of augmented reality (AR) glass, a smart phone, or a tablet terminal may be used.

Figure 17:
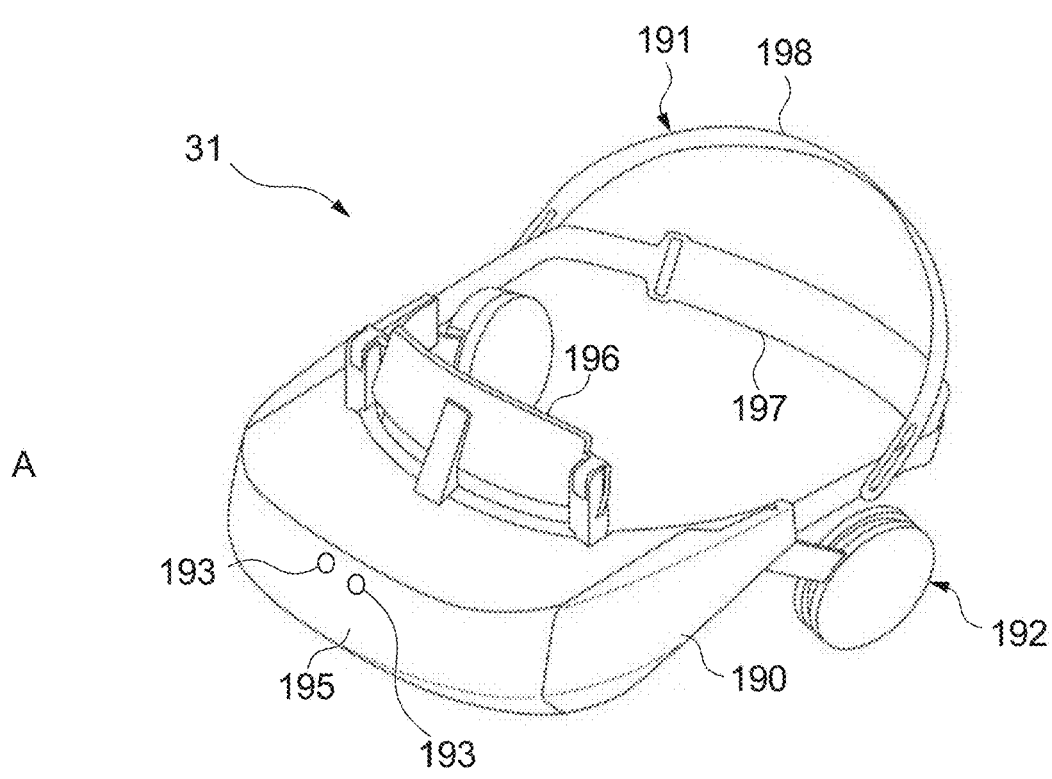
FIG. 17 is a schematic view showing an appearance of an HMD.
Figure 17:
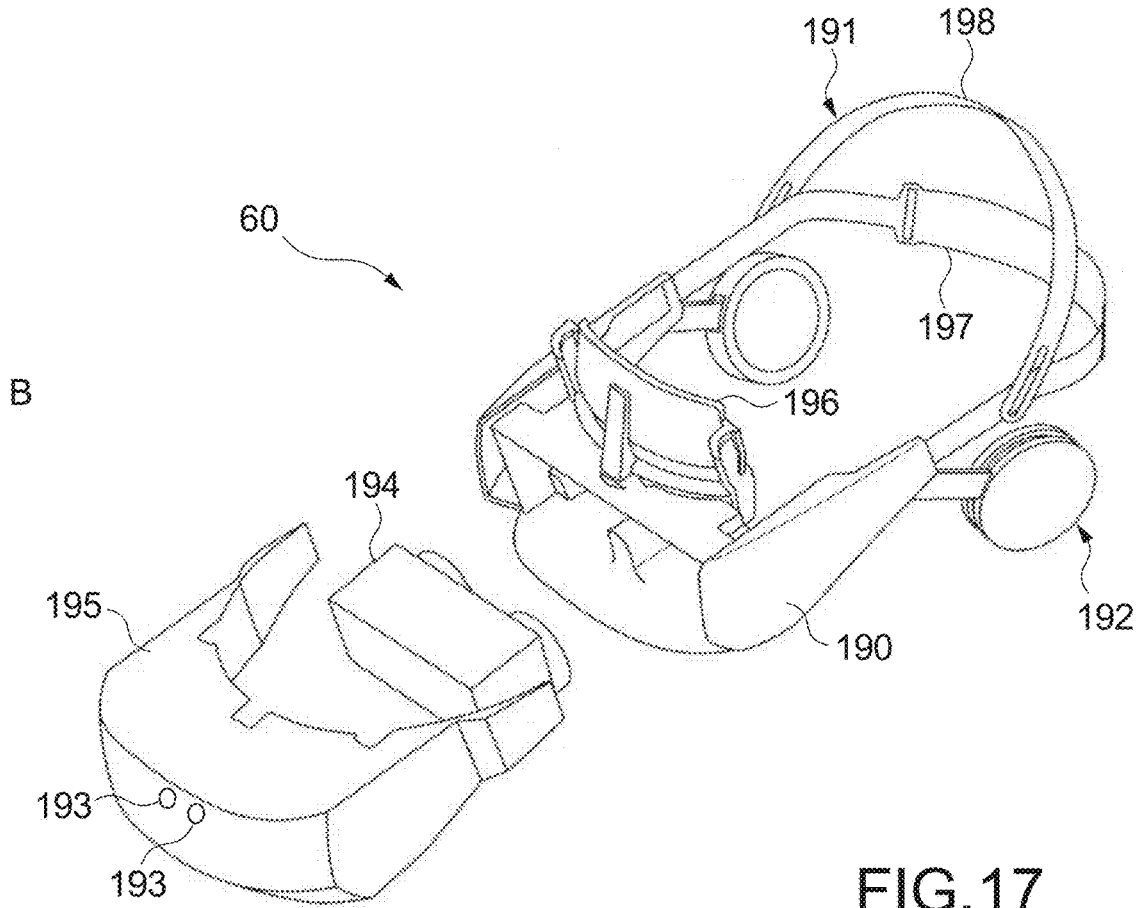

FIG. 17 is a schematic view showing the appearance of the HMD 31. A of FIG. 17 is a schematic perspective view of the appearance of the HMD 31, and B of FIG. 17 is a schematic exploded perspective view of the HMD 31.

The HMD 31 includes a base portion 190, a mounting band portion 191, a headphone portion 192, a front camera 193, a display unit 194, and a cover portion 195.

The base portion 190 is a member disposed in front of the right and left eyes of the user, and is provided with a forehead support portion 196 that abuts on the forehead of the user.

The mounting band portion 191 is mounted on the head of the user. As shown in FIG. 8, the mounting band portion 191 includes a temporal band 197 and a parietal band 198. The temporal band 197 is connected to the base portion 190 and is worn so as to surround the head of the user from the temporal region to the occipital region. The parietal band 198 is connected to the temporal band 197 and is worn so as to surround the head of the user from the temporal region to the parietal region.

The headphone portion 192 is connected to the base portion 190 and is disposed so as to cover the right and left ears of the user. The headphone portion 192 includes right and left speakers. The position of the headphone portion 192 can be controlled manually or automatically. The configuration for that is not limited, and any configuration may be adopted.

The front camera 193 is provided as a stereo camera capable of capturing an image of the real space on the front side of the user. The front camera 193 can generate a camera image in which the real space is captured.

The display unit 195 is inserted into the base portion 190 and is disposed in front of the user's eyes. A display is disposed inside the display unit 195. Any display device using, for example, liquid crystal or electroluminescence (EL) may be used as the display. Further, a lens system (whose illustration is omitted) that guides an image displayed using the display to the right and left eyes of the user is disposed in the display unit 195.

The cover portion 196 is attached to the base portion 190 and is configured to cover the display unit 195. The HMD 31 having such a configuration serves as an immersive head-mounted display configured to cover the field of view of the user. For example, a three-dimensional virtual space is displayed by the HMD 31. When wearing the HMD 31, the user can experience virtual reality (VR) or the like.

FIG. 18 is a block diagram showing a hardware configuration example of the information processing apparatus 20.

The information processing apparatus 20 includes a CPU 201, a ROM 202, a RAM 203, an input/output interface 205, and a bus 204 that connects those components to each other. A display unit 206, an input unit 207, a storage unit 208, a communication unit 209, a drive unit 210, and the like are connected to the input/output interface 205.

The display unit 206 is, for example, a display device using liquid crystal, electro-luminescence (EL), or the like. The input unit 207 is, for example, a keyboard, a pointing device, a touch panel, or another operation device. If the input unit 207 includes a touch panel, the touch panel may be integrated with the display unit 206.

The storage unit 208 is a nonvolatile storage device and is, for example, an HDD, a flash memory, or another solid-state memory. The drive unit 210 is, for example, a device capable of driving a removable recording medium 211 such as an optical recording medium or a magnetic recording tape.

The communication unit 209 is a modem, a router, or another communication device that can be connected to a LAN, a WAN, or the like for communicating with other devices. The communication unit 209 may communicate using wire or radio. The communication unit 209 is often used separately from the information processing apparatus 20.

In this embodiment, the communication unit 209 allows communication with other devices via the network.

The information processing by the information processing apparatus 20 having the hardware configuration as described above is implemented in cooperation with the software stored in the storage unit 208, the ROM 202, or the like, and the hardware resource of the information processing apparatus 20. Specifically, the information processing method according to the present technology is implemented when a program stored in the ROM 202 or the like and configuring the software is loaded into the RAM 203 and then executed.

The program is installed in the information processing apparatus 20, for example, through the recording medium 211. Alternatively, the program may be installed in the information processing apparatus 20 via a global network or the like. In addition, any non-transitory computer-readable storage medium may be used.

The information processing method, the program, and the system according to the present technology may be executed, and the information processing apparatus according to the present technology may be constructed, by linking a computer mounted on a communication terminal with another computer capable of communicating via a network or the like.

In other words, the information processing method, the program, and the system according to the present technology can be performed not only in a computer system formed of a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

Execution of the information processing method, the program, and the system according to the present technology by the computer system includes, for example, both a case in which the detection of a candidate plane, the change of an operable range, the setting of a virtual viewpoint, and the like are performed by a single computer; and a case in which the respective processes are performed by different computers. Further, the execution of each process by a predetermined computer includes causing another computer to perform a portion of or all of the process and obtaining a result thereof.

In other words, the information processing method, the program, and the system according to the present technology are also applicable to a configuration of cloud computing in which a single function is shared and cooperatively processed by a plurality of apparatuses through a network.

The configurations of the candidate plane detection unit, the operable range change unit, the virtual viewpoint setting unit, and the like; the control flow of the communication system; and the like described with reference to the respective figures are merely embodiments, and any modifications may be made thereto without departing from the spirit of the present technology. In other words, any other configurations or algorithms for purpose of practicing the present technology may be adopted.

Note that the effects described in the present disclosure are merely illustrative and not restrictive, and other effects may be obtained. The above description of the plurality of effects does not necessarily mean that these effects are simultaneously exhibited. It means that at least one of the above-mentioned effects can be obtained depending on the conditions and the like, and of course, there is a possibility that an effect not described in the present disclosure can be exhibited.

At least two of the features among the features of the embodiments described above can also be combined. In other words, various features described in the respective embodiments may be combined discretionarily regardless of the embodiments.

Note that the present technology may also take the following configurations.

(1) An information processing method, which is executed by a computer system, including a control step of controlling setting of a virtual viewpoint of a user with respect to a real space and setting of an operable range in which an operation relating to the real space can be executed by the user with respect to the real space.

(2) The information processing method according to (1), in which the control step sets a first virtual viewpoint within the real space and sets a second virtual viewpoint different from the first virtual viewpoint within the operable range.

(3) The information processing method according to (1) or (2), in which the control step changes a scale of the operable range.

(4) The information processing method according to any one of (1) to (3), further including
a detection step of detecting a candidate plane for setting the virtual viewpoint or the operable range from the real space.

(5) The information processing method according to (4), in which
the control step sets a position separated from the detected candidate plane by a predetermined distance as the virtual viewpoint.

(6) The information processing method according to (4) or (5), in which
the control step sets a position separated from the detected candidate plane by a predetermined distance as a reference point that is a reference of the operable range.

(7) The information processing method according to (6), in which
the control step controls the virtual viewpoint or the operable range on the basis of the set reference point.

(8) The information processing method according to (6), further including
a setting step of setting a position of the virtual viewpoint and a scale of the operable range on the basis of a size of the real space, in which
the control step makes changes to the set position of the virtual viewpoint and the set scale of the operable range with the reference point as a reference.

(9) The information processing method according to (4), in which
the detection step detects the candidate plane on the basis of a predetermined axis of the real space.

(10) The information processing method according to any one of (1) to (9), in which
the control step changes a scale of the operable range on the basis of a position of the virtual viewpoint.

(11) The information processing method according to any one of (1) to (10), in which
the control step sets a position of the virtual viewpoint on the basis of a scale of the operable range.

(12) The information processing method according to any one of (1) to (11), further including
a presentation step of presenting a graphical user interface (GUI) capable of controlling the virtual viewpoint and the operable range to the user.

(13) The information processing method according to (12), in which
the presentation step presents a virtual viewpoint image obtained when the user views the real space from the virtual viewpoint, and
the GUI is capable of setting a first virtual viewpoint within the real space and setting a second virtual viewpoint different from the first virtual viewpoint within the operable range.

(14) The information processing method according to (12) or (13), in which
the GUI is capable of setting the candidate plane within the operable range.

(15) The information processing method according to any one of (1) to (14), in which
the real space is a three-dimensional map created by a sensor.

(16) The information processing method according to (15), in which
the control step changes a scale of the operable range on the basis of the three-dimensional map created by the sensor.

(17) The information processing method according to (15), in which
the sensor is mounted on a mobile object.

(18) The information processing method according to (17), in which
the GUI is capable of generating a path, along which the mobile object moves, by an operation of the user.

(19) A program, which causes a computer system to execute
a control step of controlling setting of a virtual viewpoint of a user with respect to a real space and setting of an operable range in which an operation relating to the real space can be executed by the user with respect to the real space.

(20) An information processing system, including:
a mobile object that moves in a real space; and
an information processing apparatus including a control unit that controls setting of a virtual viewpoint of a user with respect to the real space and setting of an operable range in which an operation relating to the real space can be executed by the user with respect to the real space.

REFERENCE SIGNS LIST

5 user
6 virtual viewpoint
7 operable range
10 mobile object
14 sensor unit
20 information processing apparatus
23 candidate plane detection unit
24 reference point setting unit
25 operable range change unit
26 virtual viewpoint setting unit
100 virtual representation system

The invention claimed is:
1. An information processing method for controlling a mobile object, which is executed by a computer system, comprising:
obtaining a three-dimensional map of a real space surrounding the mobile object;
detecting a candidate plane from the three-dimensional map;
setting, based on the detected candidate plane, a reference point at a position separated from the detected candidate plane by a predetermined distance, the reference point serving as a reference of an operable range;
setting the operable range around the reference point, the operable range being a range in which an operation relating to the real space can be executed by the user;
setting, by a user, a virtual viewpoint of the user with respect to the real space at any location in the three-dimensional map separated from the reference point; and
generating, by the user, a path of the mobile object within the operable range.

2. The information processing method according to claim 1, wherein
setting the virtual viewpoint includes setting a first virtual viewpoint within the real space and setting a second virtual viewpoint different from the first virtual viewpoint within the operable range.

3. The information processing method according to claim 1, further comprising changing a scale of the operable range.

4. The information processing method according to claim 1, further comprising setting a position of the virtual viewpoint and a scale of the operable range on a basis of a size of the real space, and changing the set position of the virtual viewpoint and the set scale of the operable range with the reference point as a reference.

5. The information processing method according to claim 1, wherein detecting the candidate plane is based on a predetermined axis of the real space.

6. The information processing method according to claim 1, further comprising changing scale of the operable range on a basis of a position of the virtual viewpoint.

7. The information processing method according to claim 1, wherein setting the virtual viewpoint includes setting a position of the virtual viewpoint on a basis of a scale of the operable range.

8. The information processing method according to claim 1, further comprising presenting a graphical user interface (GUI) capable of controlling the virtual viewpoint and the operable range to the user.

9. The information processing method according to claim 8, wherein presenting includes presenting a virtual viewpoint image obtained when the user views the real space from the virtual viewpoint, and the GUI is capable of setting a first virtual viewpoint within the real space and setting a second virtual viewpoint different from the first virtual viewpoint within the operable range.

10. The information processing method according to claim 8, wherein the GUI is capable of setting the candidate plane for setting the virtual viewpoint or the operable range from the real space within the operable range.

11. The information processing method according to claim 1, wherein the three-dimensional map created by a sensor.

12. The information processing method according to claim 11, wherein changing a scale of the operable range on a basis of the three-dimensional map created by the sensor.

13. The information processing method according to claim 11, wherein the sensor is mounted on the mobile object.

14. The information processing method according to claim 13, further comprising:

presenting a graphical user interface (GUI) capable of generating a path, along which the mobile object moves, by an operation of the user.

15. A non-transitory computer readable storage medium storing a program thereon, which, when run, causes a computer system to execute obtaining a three-dimensional map of a real space surrounding the mobile object;

detecting a candidate plane from the three-dimensional map;

setting, based on the detected candidate plane, a reference point at a position separated from the detected candidate plane by a predetermined distance, the reference point serving as a reference of an operable range;

setting the operable range around the reference point, the operable range being a range in which an operation relating to the real space can be executed by the user:

setting, by a user, a virtual viewpoint of the user with respect to the real space at any location in the three-dimensional map separated from the reference point; and generating, by the user, a path of a mobile object within the operable range.

16. An information processing system, comprising:

a mobile object that moves in a real space; and an information processing apparatus including a control circuit configured to obtain a three-dimensional map of the real space;

detect a candidate plane from the three-dimensional map;

set, based on the detected candidate plane, a reference point at a position separated from the detected candidate plane by a predetermined distance, the reference point serving as a reference of an operable range;

set, by a user, a virtual viewpoint of the user with respect to the real space at any location in the three-dimensional map separated from the reference point, and generate, by a user, a path of the mobile object within the operable range.

* * * * *